(12) United States Patent
Takekawa et al.

(10) Patent No.: US 7,113,174 B1
(45) Date of Patent: Sep. 26, 2006

(54) COORDINATE INPUTTING/DETECTING APPARATUS AND METHOD DESIGNED TO AVOID A TRAILING PHENOMENON

(75) Inventors: Kenichi Takekawa, Nagoya (JP); Yasuhiko Saka, Nagoya (JP)

(73) Assignee: Ricoh Company, Ltd., Tokyo (JP)

( * ) Notice: Subject to any disclaimer, the term of this patent is extended or adjusted under 35 U.S.C. 154(b) by 107 days.

(21) Appl. No.: 09/653,336

(22) Filed: Aug. 31, 2000

(30) Foreign Application Priority Data

Sep. 10, 1999 (JP) .................................. 11-257477
Feb. 16, 2000 (JP) .............................. 2000-038328

(51) Int. Cl.
*G09G 5/00* (2006.01)

(52) U.S. Cl. ..................... 345/173; 345/175; 345/901; 345/902; 178/18.01; 178/18.05; 178/18.06

(58) Field of Classification Search ........ 345/173–184, 345/156–158, 132, 901, 902; 178/18–20, 178/20.01; 340/555–557; 250/221, 230, 250/231; 333/156; 310/313 B, 313 R
See application file for complete search history.

(56) References Cited

U.S. PATENT DOCUMENTS

| | | | |
|---|---|---|---|
| 4,384,201 A | | 5/1983 | Carroll et al. |
| 4,644,100 A | | 2/1987 | Brenner et al. |
| 4,710,759 A | * | 12/1987 | Fitzgibbon .................. 341/13 |
| 4,791,416 A | | 12/1988 | Adler |
| 4,918,262 A | * | 4/1990 | Flowers et al. ............. 345/173 |
| 5,196,835 A | * | 3/1993 | Blue et al. .................... 341/20 |
| 5,777,604 A | * | 7/1998 | Okajima et al. ......... 178/20.03 |
| 5,999,185 A | * | 12/1999 | Kato et al. .................. 345/420 |
| 6,104,386 A | * | 8/2000 | Yaotani .................... 178/18.01 |
| 6,215,116 B1 | * | 4/2001 | Van Marcke .......... 250/214 A |
| 6,225,986 B1 | * | 5/2001 | Sato et al. ................... 345/178 |
| 6,229,529 B1 | * | 5/2001 | Yano et al. ............... 178/18.04 |

(Continued)

FOREIGN PATENT DOCUMENTS

DE        41 21 180         1/1993

(Continued)

OTHER PUBLICATIONS

Patent Abstracts of Japan, vol. 015, No. 136 (P-1187), Apr. 4, 1991, JP 03-015920, Jan. 24, 1991.

*Primary Examiner*—Richard Hjerpe
*Assistant Examiner*—Leonid Shapiro
(74) *Attorney, Agent, or Firm*—Oblon, Spivak, McClelland, Maier & Neustadt, P.C.

(57) ABSTRACT

A coordinate inputting/detecting apparatus in which a designating device for designating a position in a flat or substantially flat two-dimensional coordinate inputting/detecting area of the coordinate inputting/detecting apparatus is judged as located in a predetermined range of the coordinate inputting/detecting area when an optical detection signal of an optical unit, that optically detects the designating device inserted into the predetermined range of the coordinate inputting/detecting area, exceeds a first predetermined threshold value. Whether or not the designating device has been inserted into the predetermined range of the coordinate inputting/detecting area is judged and coordinates of the position in the coordinate inputting/detecting area, designated by the designating device inserted in the predetermined range of the coordinate inputting/detecting area, are recognized in accordance with the optical detection signal of the optical unit. A second threshold value is used in recognizing the coordinates of the position in the coordinate inputting/detecting area, designated by the designating device inserted in the predetermined range of the coordinate inputting/detecting area. The second threshold value is set to be higher than the first threshold value used in judging if the designating device has been inserted into the predetermined range of the coordinate inputting/detecting area.

17 Claims, 17 Drawing Sheets

U.S. PATENT DOCUMENTS

| | | | |
|---|---|---|---|
| 6,359,616 B1 * | 3/2002 | Ogura et al. | 178/18.01 |
| 6,459,424 B1 * | 10/2002 | Resman | 345/173 |
| 6,492,633 B1 * | 12/2002 | Nakazawa et al. | 250/221 |
| 6,594,023 B1 * | 7/2003 | Omura et al. | 356/620 |
| 2002/0008692 A1 * | 1/2002 | Omura et al. | 345/173 |

FOREIGN PATENT DOCUMENTS

| | | |
|---|---|---|
| JP | 05-173699 | 7/1993 |
| JP | 09-319501 | 12/1997 |
| JP | 09319501 A * | 12/1997 |

* cited by examiner

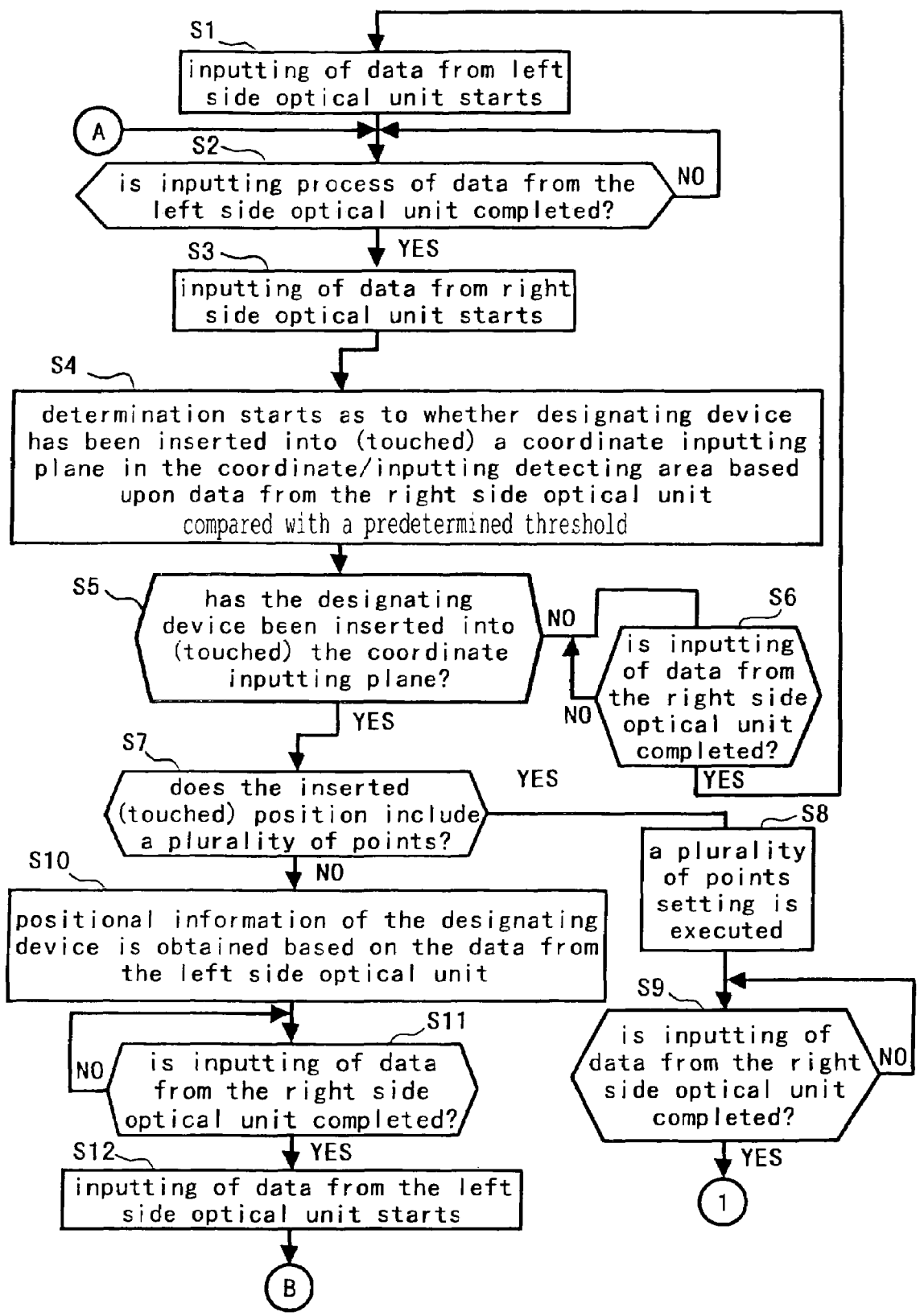

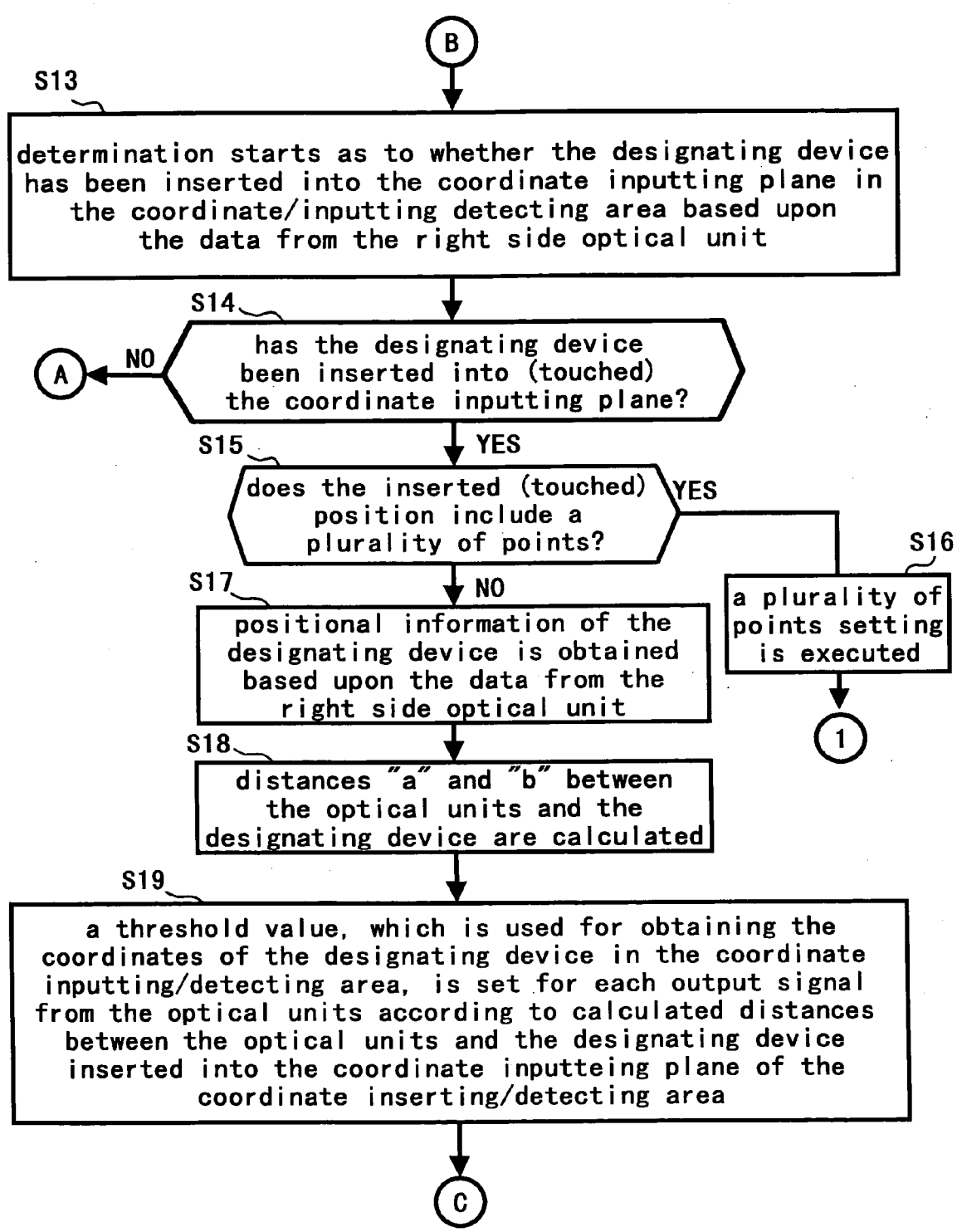

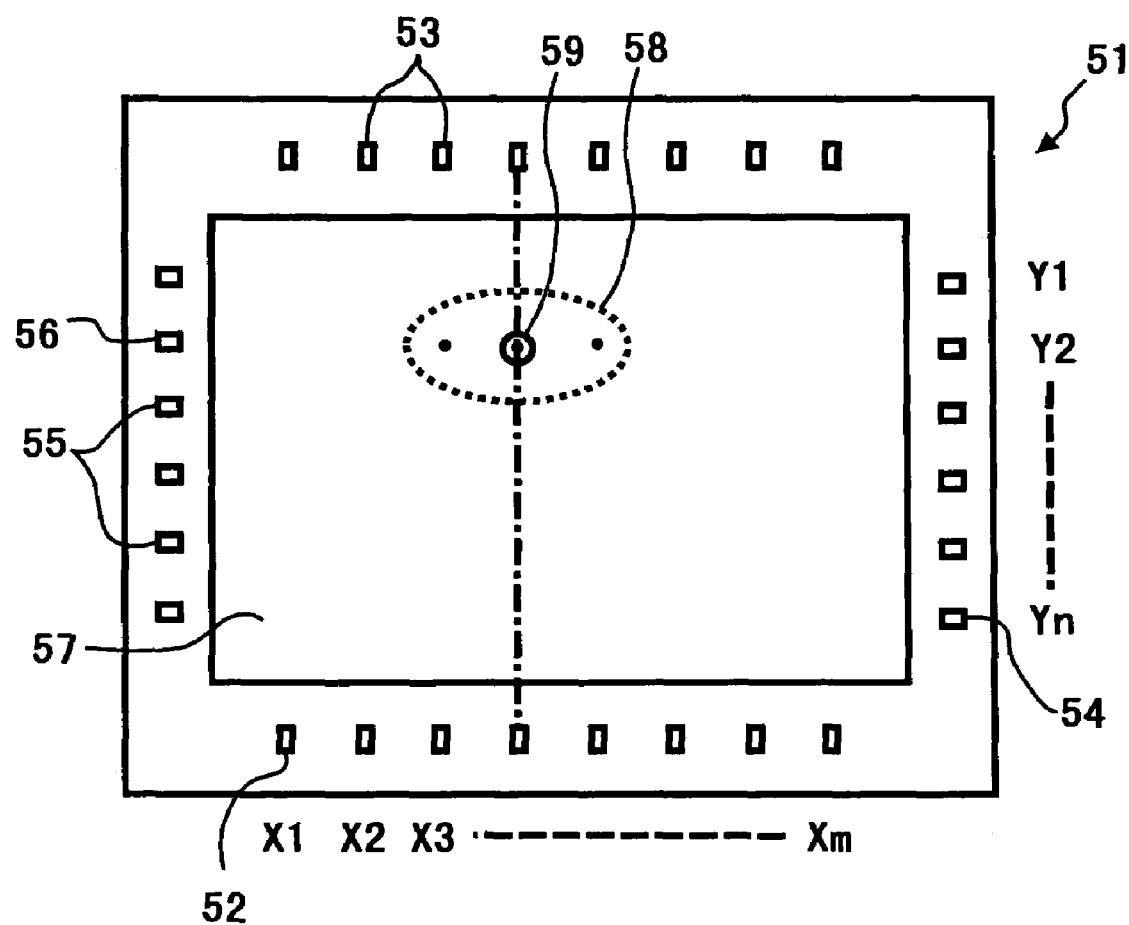

COORDINATE INPUTTING/DETECTING APPARATUS AND METHOD DESIGNED TO AVOID A TRAILING PHENOMENON

BACKGROUND OF THE INVENTION

1. Field of the Invention

The present invention relates to a coordinate inputting/detecting apparatus, and more particularly relates to an optical touch panel type coordinate inputting/detecting apparatus, that is integrated and used with an electronic white board or a large display apparatus, or used in conjunction with a personal computer, and that optically detects a coordinate position designated by a designating member, such as a pen, or a finger, for inputting or selecting information represented by the coordinate position designated by the designating member.

2. Discussion of the Background

A coordinate inputting/detecting apparatus is known in which, when a coordinate inputting surface of the coordinate inputting/detecting apparatus is pressed by a pen or when the pen approaches the coordinate inputting surface, an electrical change is caused by an electrostatic charge or an electromagnetic induction, and thereby the coordinate position of a point pressed or approached by the pen is detected.

Also, a touch panel type coordinate inputting/detecting apparatus using an ultrasonic wave is known in which, when a panel is touched, a surface elastic wave emitted over the panel is attenuated and thereby a touched position on the panel is detected, as described, for example, in Japanese Patent Laid-open Publication No. 61-239322.

However, in such a coordinate inputting/detecting apparatus that detects a coordinate position using an electrostatic force or an electromagnetic induction, an electrical switching function must be provided at a coordinate inputting surface of the coordinate inputting/detecting apparatus, thus increasing the manufacturing cost of the apparatus. Further, the pen must be connected to a main body of the apparatus, for example by a cable, which makes the operation relatively difficult.

Further, a coordinate inputting/detecting apparatus using an ultrasonic wave is generally configured for a finger to be used as a designating device. When a pen made of soft elastic material is used for the designating device, in writing a straight line with the pen on a panel, for example, although the attenuation of a surface elastic wave is reliably obtained when the pen is pressed against the panel, a sufficient contact of the pen with the panel is not obtained when the pen is moved, and thereby the line is broken. On the other hand, if the pen is pressed unnecessarily strongly while moving the pen for obtaining the sufficient contact with the panel, as the pen is moved, the panel receives a stress from the pen because of the elasticity of the pen. This causes a distortion in the panel, and a reverting force is exerted while the pen is moved. Therefore, in writing a curved line with the pen, the force of pressing the pen decreases such that the reverting force is greater than the pressing force. As a result, the attenuation of the surface elastic wave is not reliably obtained and thereby it is determined that the input is discontinued. Thus, the coordinate inputting/detecting apparatus using an ultrasonic wave has a problem in obtaining a high reliability of inputting when a pen is used for a designating device.

Further, various attempts have been made to solve the drawbacks of the above-described coordinate inputting/detecting apparatuses by providing optical type coordinate inputting/detecting apparatuses as described, for example, in Japanese Patent Laid-open publications No. 5-173699 and No. 9-319501. A touch panel type coordinate inputting/detecting apparatus having a relatively simple construction can be realized using such an optical type coordinate inputting/detecting apparatus.

Optical type coordinate inputting/detecting apparatuses have recently been widely used in conjunction with a personal computer as an effective tool for inputting or selecting information in the personal computer. However, unlike a coordinate inputting/detecting apparatus using an ultrasonic wave, a coordinate inputting/detecting surface (i.e., a touch panel) of such optical type coordinate inputting apparatuses does not have a detecting function by itself, and an optical detecting area is provided at a position slightly apart from the coordinate inputting/detecting surface of the coordinate inputting/detecting apparatus. Therefore, a space deviation exists between the actual plane where, for example, an image (e.g., character) is drawn (written) with a finger, i.e., the coordinate inputting/detecting surface, and a plane where the coordinates of the drawn image (character) are detected, and contrary to the intention of a person drawing the image (character), a trail is caused on the drawn image (character), that is reproduced, for example, on a display. That is, in an optical type coordinate inputting/detecting apparatus, a leaving of a finger from the touch panel is detected not in an instance when the finger separates from the touch panel but when the finger separates from the touch panel by more than a certain distance. Therefore, before the finger reaches such a certain distance separated from the touch panel and where the finger is actually detected as separated from the touch panel, although an operator has already intended his/her finger to be separated from the touch panel surface and drawing of a desired character has been already completed, the finger is still detected as touching the touch panel (as being inserted in the coordinate inputting/detecting area). Thereby, an unintended line is drawn at a part of a reproduced image. Such a phenomenon of drawing an intended line is called a trailing phenomenon.

For example, as illustrated in FIG. 20, when a coordinate inputting/detecting area 200 is provided at a surface side of a touch panel 201, and if a finger 202 draws a line along the surface of the touch panel 201 and separates from the surface of the touch panel 201 upon ending the drawing at a point P, the finger 202 is continued to be detected by a detecting light as touching the touch panel 202 until reaching a point P' where the finger 202 leaves the coordinate inputting/detecting area 200. Thus, the finger 202 is first detected as separated from the touch panel 202 at the point P'. Accordingly, a drawing line 203 which is displayed at a surface of the touch panel 201 via a display device does not end at the point P but instead extends to the point P', and the part between the points P and P' is displayed as a trailing line 204. In practical drawing cases, for example in drawing a Japanese Kanji character corresponding to 2 (two) as illustrated in FIG. 21A, a line is first drawn from a point ① to a point ②, and then the finger is separated from the touch panel 202 at the point ②. Thereafter, another line is drawn from a point ③ to a point ④, and the finger is separated from the touch panel 201 at a point ④. In actual drawing, however, when separating the finger from the touch panel 201 at each ending portion 205 of the points ② and ④, the above-described trailing phenomenon occurs, such that a trailing line portion 204 like a whisker is generated at each ending portion 205 as illustrated in FIG. 21B, thereby deteriorating the visibility of the drawn character. Therefore, after the drawing is completed, a troublesome operation, such as erasing the trailing line portion 204 by manipulating an erasing tool, is necessary.

Further, some Japanese Kanji and Hiragana characters have a sweeping up portion, such as, for example, a sweeping up portion 206 of Japanese Kanji character "sun" as illustrated in FIG. 21C, and a sweeping portion, such as, for example, a sweeping portion 207 of Japanese Hiragana character "tsu" as illustrated in FIG. 21E. Because these sweeping up and sweeping portions are requisite drawings in Japanese Kanji and Hiragana characters, it is necessary to distinguish these sweeping up and sweeping portions from a trailing line portion in the stopping portion 205. FIGS. 21D and 21F illustrate examples of reproduced drawn Kanji character "sun" and Hiragana character "tsu". As illustrated, a trailing line portion 204 may be generated at each of the stopping portions 205 and tip ends of the sweeping up portion 206 and the sweeping portion 207.

Thus, the above-described trailing problem in the optical type coordinate inputting/detecting apparatus is caused by a fact that a deviation exists between the actual designating condition of a designating member, such a finger, and the determination or the recognition of the designating device in the coordinate inputting area of the coordinate inputting/detecting apparatus. The result of which is that determination as to whether the designating device is inserted in the coordinate inputting/detecting area or recognition of the designating member in the coordinate inputting/detecting area of the coordinate inputting/detecting apparatus is not reliably made.

Further, the touch type coordinate inputting/detecting apparatus must be configured to include an optical unit to optically detect a designating device such as a finger or a designating member. Therefore, even when a surface of a coordinate inputting/detecting area (a touch panel) is touched by a same designating device, depending upon the position where the designating device touches the coordinate inputting/detecting area surface, the quantity of a light received by a light receiving portion of the optical unit changes. That is, the quantity of the light received by the optical unit decreases as the position where the designating device touches the coordinate inputting/detecting surface moves further from the optical unit.

In the touch panel type coordinate inputting/detecting apparatus as described above, a designating device is determined as being inserted in an optical detecting area, that is provided at a position slightly separated from a coordinate inputting/detecting surface of the coordinate inputting/detecting apparatus, when a signal, that is obtained when the designating device is inserted in the optical detecting area, exceeds a threshold value. In this case, if the threshold value is set too high, the designating device fails to be detected as being inserted in the detecting area even when the designating device is inserted in the detecting area, and on the contrary, if the threshold value is too low, the above-described trailing phenomenon is remarkable. Namely, the threshold value causes a trade-off relation between the detecting capability and the occurrence of a trailing phenomenon.

The threshold value further relates to a distance between the optical unit and the designating device. That is, if the threshold value is too high, at a position far from the optical unit, the designating device can not be determined as being inserted in the detecting area even when the designating device is inserted in the detecting area. On the contrary, if the threshold value is too low, at a position near the optical unit, a trailing phenomenon is caused. Thus, setting of an optimum threshold value is difficult.

SUMMARY OF THE INVENTION

The present invention has been made in view of the above-discussed and other problems and addresses the above-discussed and other problems.

Preferred embodiments of the present invention provide a novel coordinate inputting/detecting apparatus and method that precisely recognize a designating state of a designating device designating a drawing position in a coordinate inputting/detecting area and that reduce a trailing phenomenon in a reproduced image.

According to a preferred embodiment of the present invention, a novel coordinate inputting/detecting apparatus is provided, in which a designating device for designating a position in a flat or substantially flat two-dimensional coordinate inputting/detecting area of the coordinate inputting/detecting apparatus is judged as located in a predetermined range of the coordinate inputting/detecting area when an optical detection signal of an optical unit, that optically detects the designating device inserted into the predetermined range of the coordinate inputting/detecting area, exceeds a first predetermined threshold value. Further, whether or not the designating device has been inserted into the predetermined range of the coordinate inputting/detecting area is judged and coordinates of the position in the coordinate inputting/detecting area, designated by the designating device inserted in the predetermined range of the coordinate inputting/detecting area, are recognized in accordance with the optical detect signal of the optical unit. A second threshold value is further used in recognizing the coordinates of the position in the coordinate inputting/detecting area, designated by the designating device inserted in the predetermined range of the coordinate inputting/detecting area, and is set higher than the first threshold value used in judging if the designating device has been inserted into the predetermined range of the coordinate inputting/detecting area.

According to another preferred embodiment of the present invention, a novel coordinate inputting/detecting apparatus includes a two-dimensional coordinate inputting/detecting area that is flat or substantially flat. A designating device designates a position in the coordinate inputting/detecting area. An optical unit optically detects the designating device inserted into a predetermined range of the coordinate inputting/detecting area and outputs a detection signal according to a result of the detection. A judging device judges whether the designating device has been inserted into the predetermined range of the coordinate inputting/detecting area when the detection signal of the optical unit exceeds a first predetermined threshold value. A recognition device obtains coordinates of the position in the coordinate inputting/detecting area, designated by the designating device inserted in the predetermined range of the coordinate inputting/detecting area, by utilizing the detection signal used by the judging device in the judgement as to whether or not the designating device has been inserted into the predetermined range of the coordinate inputting/detecting area. And, a first threshold value prescribing device prescribes a second threshold value, which is used by the recognition device in obtaining the coordinates of the position in the coordinate inputting/detecting area, designated by the designating device inserted in the predetermined range of the coordinate inputting/detecting area, so as to be higher than the first threshold value, which is used by the judging device in judging whether or not the designating device has been inserted in the predetermined range of the coordinate inputting/detecting area.

The immediately above coordinate inputting/detecting apparatus may further include a distance judging device that determines a distance between the designating device inserted into the predetermined range of the coordinate inputting/detecting area and the optical unit, and a second threshold value prescribing device that prescribes, according to a result of the judgement by the distance judging device as to the distance between the designating device inserted onto the predetermined range of the coordinate inputting/detecting area and the optical unit, the first threshold value, which is used, when the recognition device obtains the coordinates of the position in the coordinate inputting/detecting area, designated by the designating device inserted into the predetermined range of the coordinate inputting/detecting area, by the judging device in judging whether or not the designating device has been inserted into the predetermined range of the coordinate inputting/detecting area, such that the threshold value is decreased as the distance between the designating device inserted into the predetermined range of the coordinate inputting/detecting area and the optical unit is increased.

Further, in the coordinate inputting/detecting apparatus, the second threshold value prescribing device may prescribe the first threshold value such that if the designating device is located at a farthest point from the optical unit in the coordinate inputting/detecting area, the designating device can be judged as having been inserted into the predetermined range of the coordinate inputting/detecting area.

Furthermore, the optical unit may include at least two optical units, and the second threshold value prescribing device may prescribe the first threshold value for each of the two optical units.

BRIEF DESCRIPTION OF THE DRAWINGS

A more complete appreciation of the present invention and many of the attendant advantages thereof will be readily obtained as the same becomes better understood by reference to the following detailed description when considered in conjunction with accompanying drawings, wherein:

FIGS. 7A–7C are flowcharts illustrating an exemplary operation of a coordinate inputting/detecting apparatus employing a returning light interrupting method, according to a preferred embodiment of the present invention;

FIG. 8 is a schematic drawing illustrating an example of a coordinate inputting/detecting apparatus using an LED array system;

DETAILED DESCRIPTION OF THE PREFERRED EMBODIMENTS

Figure 1:
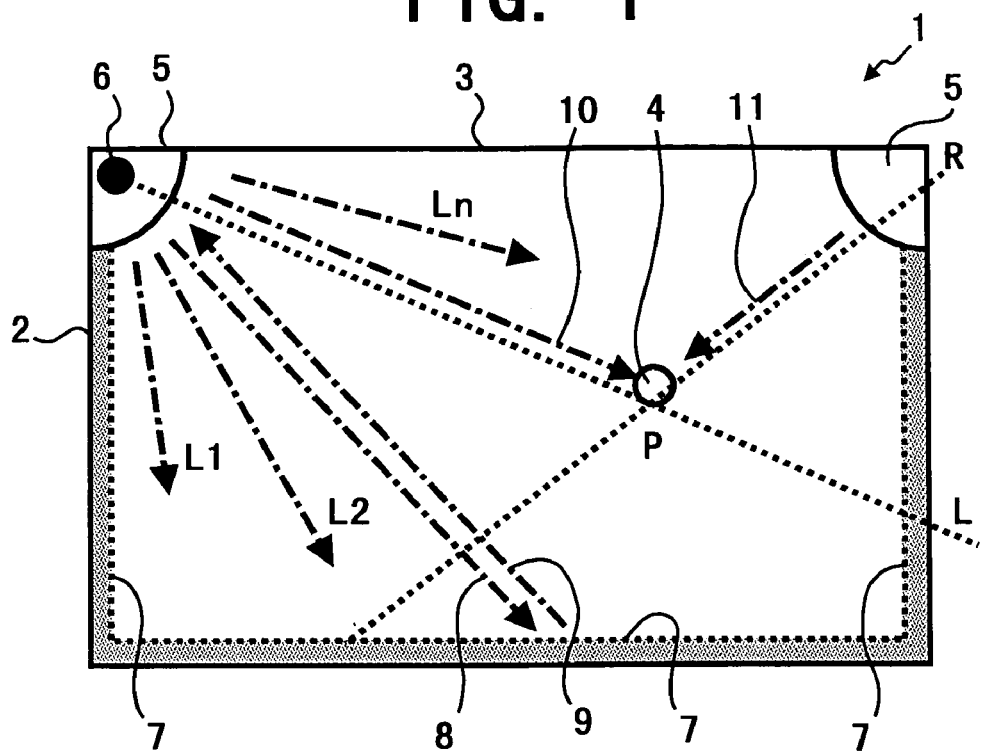
FIG. 1 is a front view illustrating a construction of a coordinate inputting/detecting apparatus employing a so-called returning light interrupting method.

Referring now to the drawings, wherein like reference numerals designate identical or corresponding parts throughout the several views, preferred embodiments of the present invention are described.

First, an exemplary construction of a coordinate inputting/detecting apparatus to which the present invention is applied is described referring to FIGS. 1–6. FIG. 1 is a front view illustrating a construction of a coordinate inputting/detecting apparatus 1 employing a so-called returning light interrupting method. A coordinate inputting/detecting area 3, which is an internal space of a coordinate inputting/detecting member 2 formed in a square shaped frame, is two-dimensionally shaped and is flat or substantially flat. The coordinate inputting/detecting area 3 may be formed, for example, by a display surface of a display apparatus that electronically displays information, e.g. a plasma display, or by a white board for writing information thereupon with a writing pen such as a marker. The coordinate inputting/detecting apparatus 1 is configured such that, when a designating device 4, that is made of an optically opaque material so as to function as a light interrupting device, for example, a finger of an operating person, a pen or a designating rod, touches on the coordinate inputting/detecting area 3, the coordinates of the designating device 4 in the coordinating inputting/detecting area 3 are detected.

An optical unit 5 is arranged at each of the upper (or lower) corners of the coordinate inputting/detecting area 3 in FIG. 1, and as illustrated as an example, probing light fluxes L1, L2, . . . , Ln are emitted from the optical unit 5 at the left side toward the coordinate inputting/detecting area 3. Specifically, these probing light fluxes L1–Ln progress, while forming a fan-like pattern, along a plane parallel to a coordinate inputting plane of the coordinate inputting/detecting area 3 extending from a secondary light source 6 having a spot shape.

Light returning reflective members 7 are attached to circumferential portions of the coordinate inputting/detecting area 3 such that each light returning reflecting surface thereof faces a center of the coordinate inputting/detecting area 3.

Each light returning reflective member 7 has the property to reflect an incident light thereto in a reversed direction independent of the incident angle. For example, a beam 8 emitted from the optical unit 5 at the left side is reflected by the light returning reflective member 7 so as to return toward the optical unit 5, as a returning reflected light 9, while passing through the same optical path the beam 8 passed through when moving toward the light reflective member 7 from the optical unit 5. A light receiving device (described later) is arranged in the optical unit 5 so as to determine if a returning light has returned to the optical unit 5 with respect to each of the probing light fluxes L1–Ln.

For example, if the operator touches a position P by a finger (the designating device 4), a probing light flux 10 is interrupted by the finger, and thereby the light flux 10 does not reach the light returning reflective member 7. Accordingly, a returning light of the probing light 10 does not reach the optical unit 5, and thereby the returning light corresponding to the probing light flux 10 is detected as not having been received by the light receiving device. Thus, it is detected that the designating member 4 is inserted on a path (a straight line L) of the probing light 10. Likewise, by emitting a probing light flux 11 from the optical unit 5 provided at the upper right corner of the coordinate inputting/detecting area 3 and by detecting that a returning light corresponding to the probing light flux 11 is not received by the right side optical unit 5, it is determined that the designating device 4 is inserted on a path (a straight line R) of the probing light flux 11. Here, if the information of the line L and the line R can be obtained, by obtaining the coordinates of the point P by calculation, the coordinates of a position in the coordinate inputting area 3 where the designating device 4 is inserted can be obtained.

Figure 2:
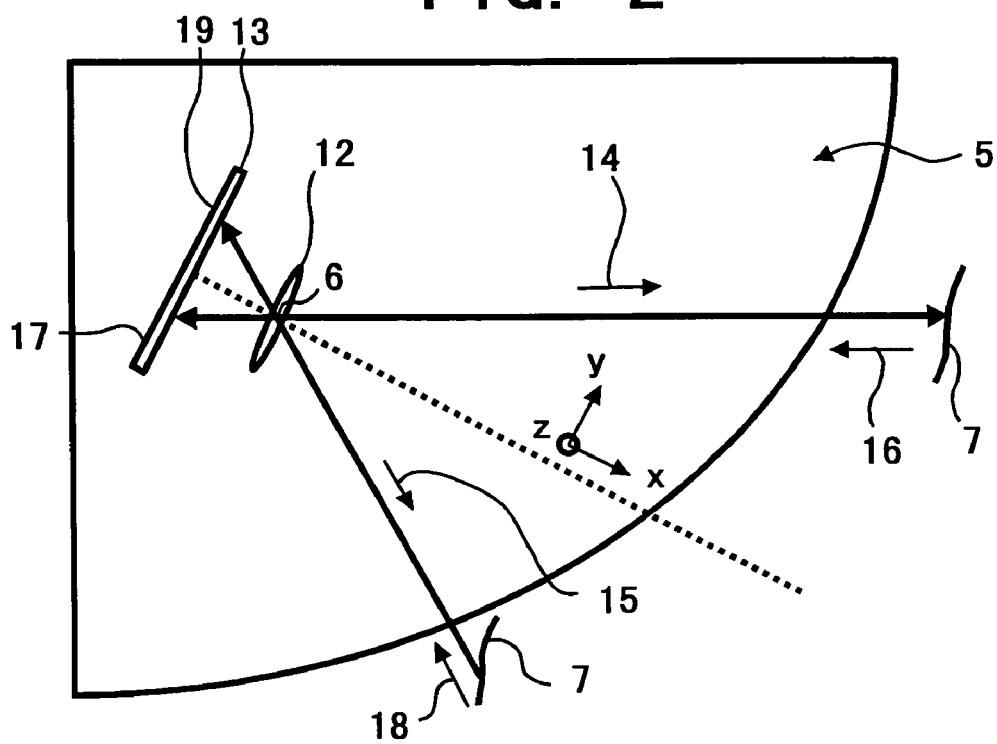
FIG. 2 is a schematic drawing illustrating an exemplary construction of an optical unit to emit and receive a light, that is attached to a coordinate inputting surface of a coordinate inputting/detecting area of the coordinate inputting/detecting apparatus, which is viewed in a direction perpendicular to the coordinate inputting/detecting area of the coordinate inputting/detecting apparatus.

Next, a construction of the optical unit 5 and a mechanism to detect which one of the probing light fluxes L1–Ln has been interrupted are described. FIG. 2 is a diagram illustrating an exemplary construction of the optical unit 5 attached to the coordinate inputting plane of the coordinate inputting/detecting area 3, which is viewed in a direction perpendicular to the coordinate inputting/detecting area 3. For the sake of simplicity, the explanation is made for a two-dimensional plane parallel to the coordinate inputting/detecting area 3.

The optical unit 5 includes, as illustrated in FIG. 2, the light source 6, a condensing lens 12, and a light receiving element 13 including, for example, a photodiode (PD). The light source 6 emits light fluxes formed in a fan-like pattern in a direction opposite the light receiving element 13 when viewed from the light source 6. The fan-like pattern of light fluxes emitted from the light source 6 are the collected beams proceeding in directions indicated by arrows 14, 15 and in other directions. Also, a beam moving in the direction indicated by the arrow 14 is reflected by the light returning reflective member 7 in a direction indicated by an arrow 16 and passes through the condensing lens 12 to reach a position 17 on the light receiving element 13. A beam moving in the direction indicated by the arrow 15 is reflected by the light returning reflective member 7 and passes through the condensing lens 12 to reach a position 19 on the light receiving element 13. Thus, the light fluxes, which have been emitted from the light source 6 and reflected by the light returning reflective member 7 so as to return through the same respective light paths when moving to the light returning reflective member 7, reach different positions on the light receiving element 13, respectively. Accordingly, if the designating device 4 is inserted in a certain position in the coordinate inputting/detecting area 3 and a light flux is interrupted by the designating device 4, a returning light does not reach a position on the light receiving element 13 corresponding to the interrupted light flux. Therefore, by examining the light intensity distribution on the light receiving element 13, which one of the light fluxes L1–Ln has been interrupted can be recognized.

Figure 3:
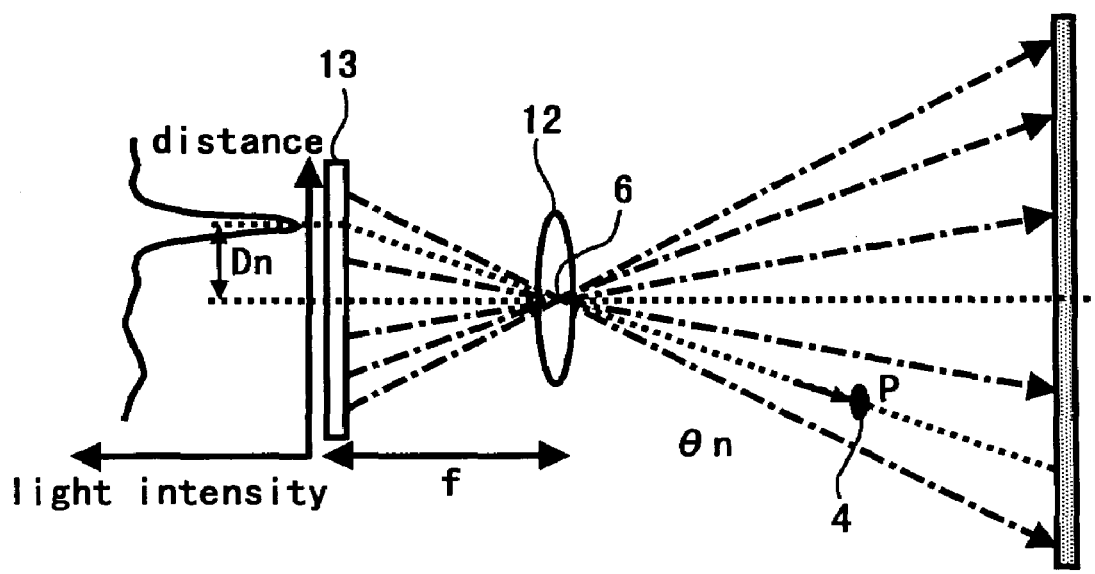
FIG. 3 is a schematic drawing for explaining an operation of detecting a designated point in the coordinate inputting/detecting area of the coordinate inputting/detecting apparatus.

The above operation is described more in detail with reference to FIG. 3. In FIG. 3, the light receiving element 13 is arranged at a focusing plane (at a position of a focusing length f) of the condensing lens 12. A light flux emitted from the light source 6 toward the right side in FIG. 3 is reflected by the light returning reflective member 7 so as to return through the same optical path as when moving to the light returning reflective member 7. Accordingly, the reflected returning light flux is again condensed at the position of the light source 6. The condensing lens 12 is arranged such that the center thereof coincides with the position of the light source 6. Because a reflected light returned from the light returning reflective member 7 passes through the center of the condensing lens 12, the reflected returning light proceeds toward a rear side of the condensing lens 12 (toward the light receiving element 13) passing through a symmetrical light path.

If the designating device 4 is not inserted in the coordinate inputting/detecting area 3, the light intensity distribution on the light receiving element 13 is substantially uniform. However, as illustrated in FIG. 3, if the designating device 4 having the property of interrupting a light is inserted in the coordinate inputting/detecting area 3 at the position P, a light flux passing the point P is interrupted by the designating device 4, and thereby an area where the light intensity is weak (a blind point) is generated at a position on the light receiving element 13 a distance Dn apart from the position corresponding to the optical axis of the condensing lens 12. The distance Dn corresponds to an emerging/incident angle $\theta n$ of the interrupted light flux, and the angle $\theta n$ can be known by detecting the distance Dn. That is, the angle $\theta n$ can be expressed as a function of the distance Dn as follows:

$$\theta n = \arctan(Dn/f) \quad (1).$$

Here, the angle $\theta n$ and the distance Dn in the optical unit 5 at the upper left corner of the coordinate inputting/detecting area 3 in FIG. 1 are respectively replaced with an angle $\theta nL$ and a distance DnL.

Further, in FIG. 4, according to a conversion coefficient "g" of a geometrical relationship between the optical unit 5 and the coordinate inputting/detecting area 3, an angle θL formed by the designating device 4 and the coordinate inputting/detecting area 3 can be expressed as a function of the distance DnL obtained by the above equation (1), as follows:

$$\theta L = g(\theta nL) \quad (2),$$

wherein θnL=arctan(DnL/f).

Likewise, with respect to the optical unit 5 arranged at the upper right corner of the coordinate inputting/detecting area 3 in FIG. 1, replacing reference L in the above equations (1) and (2) with reference R, according to a conversion coefficient "h" of a geometrical relationship between the optical unit 5 at the upper right corner and the coordinate inputting/detecting area 3, an angle θR formed by the designating device 4 and the coordinate inputting/detecting area 3 can be expressed as follows:

$$\theta R = h(\theta nR) \quad (3),$$

wherein θnR=arctan(DnR/f).

Figure 4:
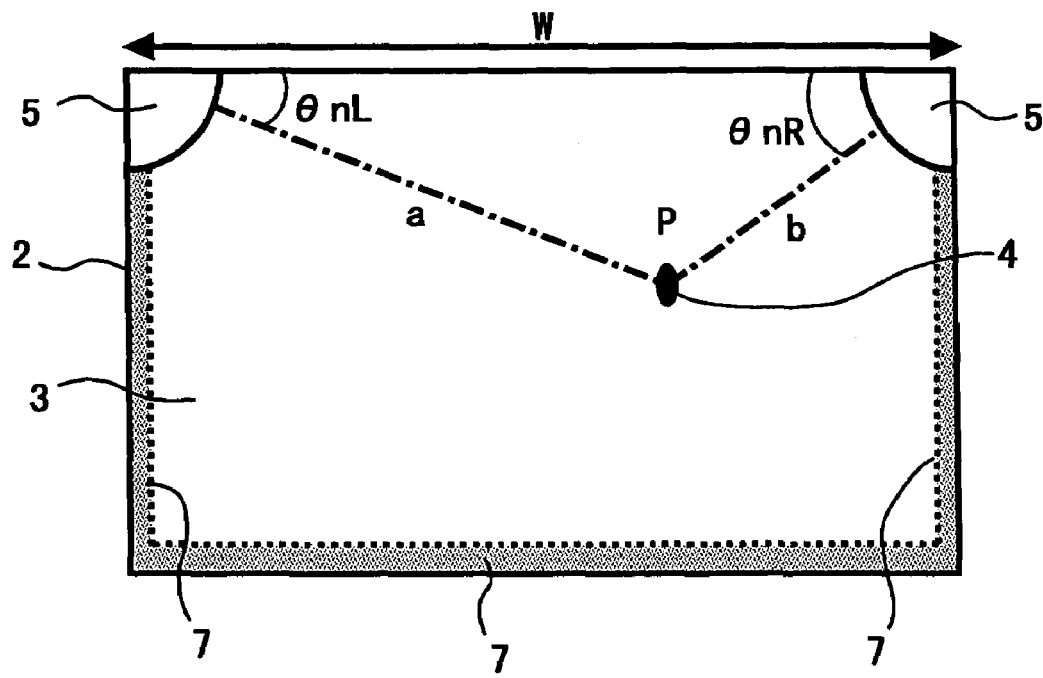
FIG. 4 is another schematic drawing for explaining the operation of detecting a designated point in the coordinate inputting/detecting area of the coordinate inputting/detecting apparatus.

When an interval between the optical units 5 arranged at the upper right and left corners of the coordinate inputting/detecting area 3 is expressed by "w" and the origin of the coordinate axes is set as illustrated in FIG. 4, two dimensional coordinates (x, y) of the point P designated by the designating device 4 are expressed as follows:

$$x = w \cdot \tan\theta nR / (\tan\theta nL + \tan\theta nR) \quad (4)$$

$$y = w \cdot \tan\theta nL \cdot \tan\theta nR / (\tan\theta nL + \tan\theta nR) \quad (5).$$

Thus, "x" and "y" are expressed as a function of DnL and DnR. That is, the two dimensional coordinates of the point P designated by the designating device 4 can be obtained by detecting the distances DnL, DnR of the blind points on the light receiving element 13 of the optical units 5 provided at the upper left and right corners of the coordinate inputting/detecting area 3 and by considering the geometrical disposition of the optical units 5.

Figure 5:
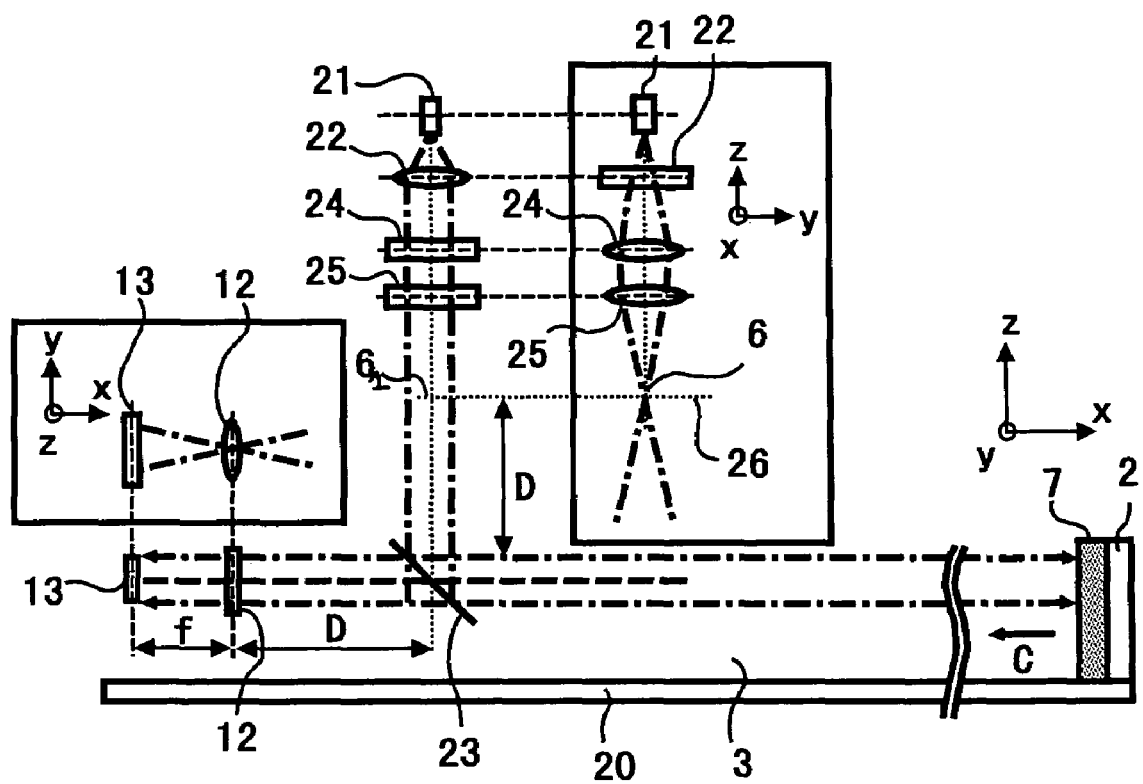
FIG. 5 is a cross section view illustrating an example of arranging the optical unit at a display surface of a display apparatus.

Next, an example in which an optical system is disposed in the coordinate inputting/detecting area 3, for example, at a surface of a display apparatus, is described. FIG. 5 illustrates an example in which one of the optical units 5 is arranged at a display surface of a display apparatus.

In FIG. 5, reference numeral 20 denotes a cross-section of the display surface viewed in a direction from a negative side to a positive side of the y axis illustrated in FIG. 2, that is in an x-z direction. The same portions of the optical system 5 viewed from different directions (an x-y direction, a y-z direction) are also illustrated in FIG. 5 in the parts enclosed by two-dot-straight lines.

As a light source 21, a laser diode or a pinpoint LED, which can make an optical spot relatively small, is used. A light flux emitted by the light source 21 in a direction perpendicular to the display surface 20 is collimated only in the x direction by a cylindrical lens 22 such that the collimated light flux, after later having been reflected by a half-mirror 23, proceeds in a direction perpendicular to the display surface 20 as a parallel light flux. After passing through the cylindrical lens 22, the light flux is converged in the y direction by two cylindrical lenses 24, 25 that have a curvature distribution in a direction crossing with that of the cylindrical lens 22.

An area condensed in a linear shape is formed by the function of these cylindrical lenses 22, 24, 25 at the rear of the cylindrical lens 25, where a slit 26 which is narrow in the y direction and elongated in the x direction is inserted. That is, a secondary light source $6_1$ having a linear shape is formed at the position of the slit 26. A light emitted from the secondary light source $6_1$ is reflected by the half-mirror 23, and proceeds as a parallel light along the display surface 20, while not extending in a direction perpendicular to the display surface 20, but extending in a fan-like shape about the secondary light source $6_1$ in a direction parallel to the display surface 20. The light flux is reflected by the light returning reflective member 7 provided at circumferential edges of the display apparatus, and the reflected light returns to the half-mirror 23 (in a direction indicated by an arrow C) passing through the same light path the light flux passed through when moving toward the light returning reflective member 7. The light flux which has passed through the half-mirror 23 moves in parallel to the display surface 20, and passes through a cylindrical lens 12 to be incident on the light receiving element 13.

The secondary light source $6_1$ and the cylindrical lens 12 are both arranged at a position a distance D apart from the half-mirror 23 and are in a conjugate relationship. Accordingly, the secondary light source $6_1$ having a linear shape corresponds to the secondary light source 6 having a spot shape in FIG. 3 and the cylindrical lens 12 corresponds to the lens 12 in FIG. 3.

Figure 6:
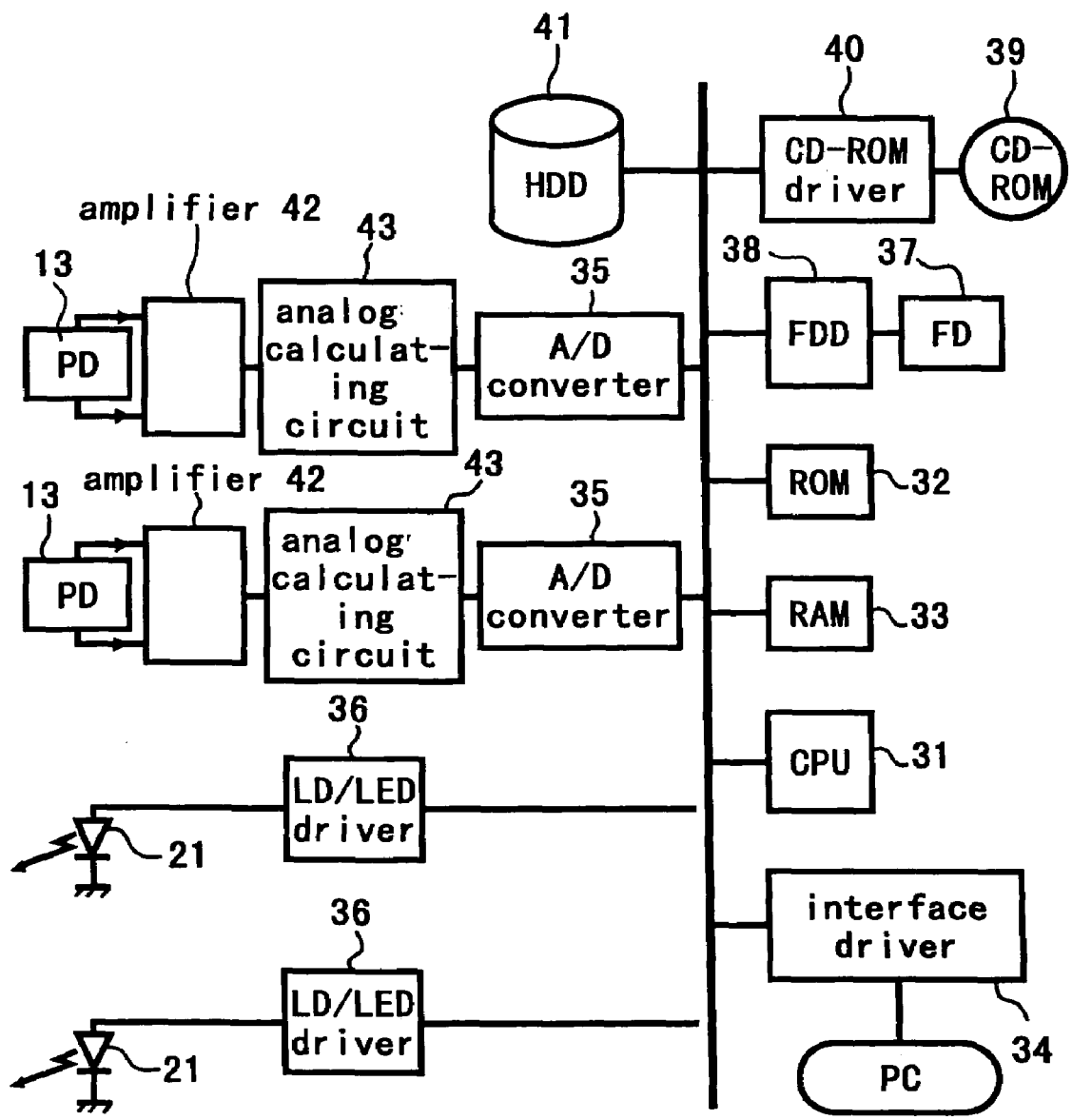
FIG. 6 is a block diagram illustrating a construction of a control circuit of a light source and a light receiving element of the optical unit.

FIG. 6 is a block diagram illustrating a construction of a control circuit for the light source 21 and the light receiving element 13. In FIG. 6, the light receiving element 13 is labeled as PD 13. The control circuit controls the emission of the light source 21 and calculates the output from the light receiving element 13. As illustrated in FIG. 6, the control circuit includes a CPU 31, a ROM 32 for storing programs and data, a RAM 33, an interface driver 34, an A/D converter 35, and an LD/LED driver 36, each connected to a bus. The CPU 31, the ROM 32, and the RAM 33 constitute a microcomputer, and a floppy disk FD driver (FDD) 38 attaching a FD 37, a CD-ROM driver 40 attaching a CD-ROM 39, and a hard disk HD driver (HDD) 41 are connected thereto.

An amplifier 42 and an analog calculating circuit 43 are connected to an output terminal of the light receiving element 13 as the circuits for calculating the output of the light receiving element 13. The output from the light receiving element 13 (a light intensity distribution signal) is input to the amplifier 42 so as to be amplified. The amplified signal is processed by the analog calculating circuit 43, converted to a digital signal by the A/D converter 35, and is then transferred to the CPU 31. Thereafter, the CPU 31 calculates a light receiving angle at the light receiving element 13 and two-dimensional coordinates of the designating device 4.

The control circuit may be housed in a housing of one of the optical units 5, or may be housed in a separate housing and accommodated in a part of the coordinate inputting/detecting area 3. Further, an output terminal may be preferably provided to the control circuit for outputting calculated coordinate data to a personal computer PC via the interface driver 34.

Now, an exemplary operation of a coordinate inputting/detecting apparatus employing a returning light interrupting method, according to a preferred embodiment of the present invention, is described with reference to FIGS. 7A–7C, and to FIGS. 1–6 as well, as appropriately. In the coordinate inputting/detecting apparatus 1 according to the above preferred embodiment of the present invention, a computer readable program stored in the FD 37 or CD-ROM 39 serving as an information storage medium is read out by the FD driver 38 or the CD-ROM driver 40 and is installed in the HD driver 41. The CPU 31 causes a part of the programs stored in the HD driver 41 to be stored in the RAM 33 as necessary, and performs a process as described in FIGS. 7A–7C by executing the programs.

In the coordinate inputting/detecting apparatus 1 according to the above preferred embodiment of the present invention, after the power is turned on, a process of inputting of data from the optical unit 5 at the left side in the coordinate inputting/detecting area 3 starts (step S1). In the process, after an output signal (a light intensity distribution signal) from the light receiving element 13 of the optical unit 5 at the left side is input to the amplifier 42 and amplified, the output signal is processed by the analog calculating circuit 43, and is then converted to a digital signal by the A/D converter 35 to be transferred to the CPU 31. After the inputting process of data from the optical unit 5 at the left side is completed (YES in step S2), a process of inputting of data from the optical unit 5 at the right side starts (step S3). In the process, after an output signal (a light intensity distribution signal) from the light receiving element 13 of the optical unit 5 at the right side is input to the amplifier 42 and amplified, the output signal is processed by the analog calculating circuit 43, and is then converted to a digital signal by the A/D converter 35 to be transferred to the CPU 31. The digital output signal from the light receiving element 13 thus transferred to the CPU 31 is temporarily stored in a register of the RAM 33.

Thereafter, based upon the data from the optical unit 5 at the left side, a determination starts as to whether or not the designating device 4 has been inserted into (has touched) a coordinate inputting/detecting plane of the coordinate/inputting detecting area 3 (step S4). The determination is made by judging if the digital output signal from the light receiving element 13, which has been input into the CPU 31, exceeds a predetermined threshold value, i.e. exceeds a first threshold value. The predetermined threshold value is stored in the ROM 32 in advance as digital data, and the digital output signal from the light receiving element 13 is compared with the predetermined threshold value. For increasing the reliability of detection, the threshold value, which is set to be relatively low, is used in the above process. Thus, it is determined that the designating device 4 has been inserted into a predetermined range of the coordinate inputting/detecting area 3 when a detect signal of the optical unit 5 exceeds a predetermined threshold value.

If it is determined, as a result of the determination in step S5, that the designating device 4 has not been inserted into (has not touched) the coordinate inputting/detecting plane of the coordinate inputting/detecting area 3 (NO in step S5), the operation waits until the inputting of data from the optical unit 5 at the right side is completed (step S6), and then the operation proceeds to step S1 again. If it is determined, as a result of the determination in step S5, that the designating device 4 has been inserted into (has touched) the coordinate inputting/detecting plane of the coordinate inputting/detecting area 3 (YES in step S5), it is determined if the inserted (touched) position includes a plurality of points (step S7). If it is determined that the inserted position includes a plurality of points (YES in step S7), a plurality of points setting is executed (step S8), the operation waits until the inputting of data from the optical unit 5 at the right side is completed (step S9), and then the operation returns to the process of step S1 again. The process of the plurality points setting is described below.

If it is determined as a result of the determination in Step S5 that the designating device 4 has been inserted into (has touched) the coordinate inputting/detecting plane of the coordinate inputting/detecting area 3 (YES in step S5), after it is determined that the inserted (touched) position does not include a plurality of points (NO in step S7), the positional information of the designating device 4 is obtained based upon the data from the optical unit 5 at the left side (S10). Obtaining of positional information here means a process of obtaining an angle $\theta L$ formed by the designating device 4 and the coordinate inputting/detecting area 3. Specifically, as described above, the angle $\theta L$ formed by the designating device 4 and the coordinate inputting/detecting area 3 is expressed as a function of DnL obtained by the above equation (1) as follows:

$$\theta L = g(\theta nL) \qquad (2),$$

wherein $\theta nL = \arctan(DnL/f)$. Therefore, in step S10, the angle $\theta L$ is obtained.

Then, after waiting until inputting of data at the right side optical unit 5 is completed (YES in step S11), inputting of data from the optical unit 5 at the left side starts (step S12). In the process, as described above, after an output signal (a light intensity distribution signal) from the light receiving element 13 of the optical unit 5 at the left side is input to the amplifier 42 and is amplified, the output signal is processed by the analog calculating circuit 43, and is then converted to a digital signal by the A/D converter 35 to be transferred to the CPU 31. The digital output signal from the light receiving element 13 thus transferred to the CPU 31 is temporarily stored in the register of the RAM 33.

Thereafter, based upon the data from the optical unit 5 at the left side, a determination starts as to whether the designating device 4 has been inserted into (has touched) the coordinate inputting plane in the coordinate/inputting detecting area 3 (step S13). The determination is made by judging if the digital output signal from the light receiving element 13, which has been input into the CPU 31, exceeds a predetermined threshold value as in the process in step S5. The predetermined threshold value is stored in the ROM 32 in advance as digital data, and the digital output signal from the light receiving element 13 is compared with the predetermined threshold value. For increasing the reliability of detection, the threshold value, which is set to be relatively low, is used in the above process. Thus, it is determined that the designating device 4 has been inserted into a predetermined area of the coordinate inputting/detecting area 3 when a detect signal of the optical unit 5 exceeds a predetermined threshold value.

The operation then proceeds to step S14. If it is determined, as a result of the determination in step S14, that the designating device 4 has not been inserted into (has not touched) the coordinate inputting plane in the coordinate inputting/detecting area 3 (NO in step S14), the operation returns to step S2. If it is determined as a result of the determination in step S14 that the designating device 4 has been inserted into (has touched) the coordinate inputting plane in the coordinate inputting/detecting area 3 (YES in step S14), then, it is determined if the inserted (touched) position includes a plurality of points (step S15). If it is determined that the (inserted) touched position includes a plurality of points (YES in step S15), a plurality of points setting is executed (step S16), and the operation returns to the process of step S1 again. The operation of the plurality points setting is described below.

If it is determined as a result of the determination in step S14 that the detecting device 4 has been inserted into (has touched) the coordinate inputting plane of the coordinate inputting/detecting area 3 (YES in step S14), after it is determined that the (inserted) touched position does not include a plurality of points in step S15 (NO in step S15), the positional information of the designating device 4 is obtained based upon the data from the optical unit 5 at the right side (step S17). Obtaining of positional information here means a process of obtaining an angle θR formed by the designating device 4 and the coordinate inputting/detecting area 3. More specifically, as described above, the angle θR formed by the designating device 4 and the coordinate inputting/detecting area 3 can be expressed, by replacing reference L with reference R in the above equations (1) and (2), according to a conversion coefficient "h" for a geometrical relationship between the optical unit 5 at the right side and the coordinate inputting/detecting area 3, as follows:

$$\theta R = h(\theta nR) \quad (3),$$

wherein θnR=arctan(DnR/f). Accordingly, in step S17, the angle θR is obtained.

Thus, in step S10, the positional information of the designating device 4 is obtained by the above equation (2) based upon the data from the optical unit 5 at the left side, and in step S17, the positional information of the designating device 4 is obtained by the above equation (3) based upon the data from the optical unit 5 at the right side. Then, in step S18, distances "a" and "b" between the optical units 5 and the designating device 4 (refer to FIG. 4) are calculated. For the calculation, first, the two dimensional coordinates (x, y) of the point P, which is designated by the designating device 4, are obtained by the above equations (2) and (3). As described above, the coordinates (x, y) can be obtained from the following equations (4) and (5), when the interval between the two optical units 5 is expressed by "w" and the coordinate origin point is set as illustrated in FIG. 4:

$$x = w \cdot \tan \theta nR / (\tan \theta nL + \tan \theta nR) \quad (4)$$

$$y = w \cdot \tan \theta nL \cdot \tan \theta nR / (\tan \theta nL + \tan \theta nR) \quad (5).$$

Then, based upon the positional information of the designating device 4 obtained based upon the data from the optical units 5 at both sides (refer to the above equations (2) and (3)), and the two dimensional coordinates (x, y) of the point P in the coordinate inputting/detecting area 3, designated by the designating device 4 (refer to the above equations (4) and (5)), that are thus obtained, using a trigonometric function, the distances "a" and "b" between the optical units 5 and the designating device 4 are obtained as follows:

$$a = \sqrt{(x^2 + y^2)} \quad (6)$$

$$b = \sqrt{((w-x)^2 + Y^2)} \quad (7).$$

The function (the distance determining function) of a distance determining device to determine a distance between the optical unit 5 and the designating device 4 inserted into the coordinate inputting/detecting area 3 is thus performed by a calculating process by the CPU 31 as described above. The above calculation process is just an example and the distances "a" and "b" may be obtained by any other calculation processes.

Then, a threshold value, which is used for obtaining the coordinates of the designating device 4 in the coordinate inputting/detecting area 3, is set for each output signal from the optical units 5 according to the calculated distances "a" and "b" between the optical units 5 and the designating device 4 inserted into the coordinate inputting plane of the coordinate inserting/detecting area 3 (step S19). In this setting, the threshold value is set to decrease as the distance between the optical unit 5 and the designating device 4 increases. As an example, if a light receiving level of the light receiving element 13 is 10 (black) when the distance between the optical unit 5 and the designating device 4 is 100 mm and 200 when the distance is 2000 mm, the formula for obtaining the threshold value is as follows:

Threshold value={(distance "a" or "b"−100)÷10}+ 10+γ, wherein γ is a predetermined value to be added so that a signal resulting from the detection of a position can be securely recognized even when the signal is disturbed by noise. In order to secure the reliability of detection, a lowest threshold value is set such that the designating device 4 located at a farthest point from the optical units 5 in the coordinate inputting/detecting area 3 can be detected. Thus, the optimum threshold value is calculated for each optical unit 5 according to the distance between the optical units 5 and the designating device 4 inserted into the coordinate inputting plane of the coordinate inputting/detecting area 3. Thus, the function (the second function) of a second threshold value setting device to set a threshold value, i.e. to set a second threshold value, used for obtaining the coordinates of the designating device 4 in the coordinate inputting/detecting area 3 such that the threshold value is smaller as the distance between the optical unit 5 and the designating device 4 inserted into the coordinate inputting plane of the coordinate inputting/detecting area 3 is longer is performed. Each threshold value calculated here is larger than the one used for the processes of steps S5 and S14. That is because while, in the processes of step S5 and S14, whether or not the designating device 4 has been inserted into the coordinate inputting/detecting plane of the coordinate inputting/ detecting area 3 is determined and therefore, for securing a reliable determination, the threshold value must be set to be relatively small so that a detection can be easily made, the threshold value used for obtaining the coordinates of the designating device 4 in the coordinate inputting/detecting area 3 must be set to be as high as possible so that a trailing phenomenon can be prevented as described above. Thus, the function of a first threshold value setting device (a first threshold setting function) to set a threshold value, which is used in obtaining the coordinates of the designating device 4 in the coordinate inputting/detecting area 3, so as to be higher than a threshold value which is used in determining whether or not the designating device 4 has been inserted into the coordinate inputting/detecting plane of the coordinate inputting/detecting area 3, is performed.

Figure 7C:
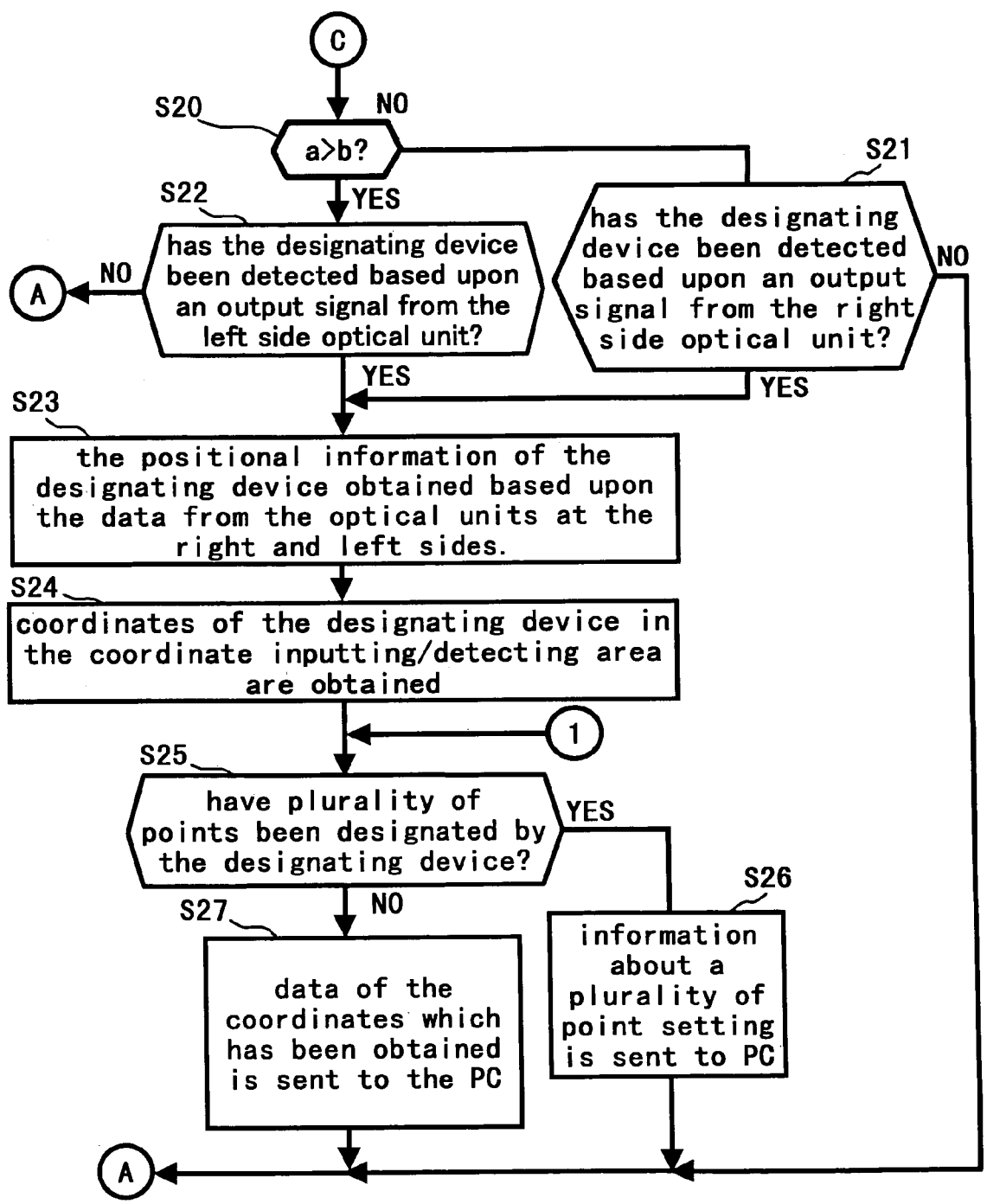

Thereafter, the process of obtaining the coordinates of the designating device 4 in the coordinate inputting/detecting area 3 is performed (steps S20–S24 in FIG. 7C). Specifically, based upon the distances "a" and "b" between the designating device 4 and the optical units 5 obtained in step S18, a determination as to a>b is made (step S20). If the distance "a" is shorter than the distance "b" in step S20 (NO in step S20), it is determined whether the designating device 4 has been detected based upon the output signal from the optical unit 5 at the right side in step S21, that is, it is determined whether the designating device 5 has been inserted into (has touched) the coordinate inputting/detecting plane of the coordinate inputting/detecting area 3 in step S21. If YES in step S21 the positional information of the designating device 4 is obtained based upon the data from the optical units 5 at the right and left sides (refer to the above equations (2) and (3)) (in step S23). If the distance "a" is longer than the distance "b" in step S20 (YES in step S20), it is determined whether the designating device 4 has been detected based upon the output signal from the optical unit 5 at the left side, that is, it is determined whether the designating device 4 has been inserted into (has touched) the coordinate inputting/detecting plane of the coordinate inputting/detecting area 3 (in step S22). If YES in step S22 the positional information of the designating device 4 is obtained based upon the data from the optical units 5 at the right and left sides (refer to the above equations (2) and (3)) (in step S23). When the answer in step S21 or S22 is NO, the operation returns to step S2.

In the detection of the designating device 4 in steps S21 and S22, for avoiding performing the process of obtaining data from the light receiving element 13 again so as to thereby increase the processing speed, the data which has been input in steps S3 and S12 and which has been temporarily stored in the register of the RAM 33 is used. That is, in steps S21 and S22, the digital output signal from the light receiving element 13, which has been temporarily stored in the register of the RAM 33, is used again in determining whether or not the designating device 4 has been inserted into the coordinate inputting/detecting plane of the coordinate inputting/detecting area 3. Specifically, whether or not the designating device 4 has been inserted into the coordinate inputting/detecting plane of the coordinate inputting/detecting area 3 is determined in steps S21 and S22 by applying the threshold value, which has been set for each of the distances "a" and "b", to the digital output signal from the light receiving element 13 stored in the RAM 33. The reason why the data for a longer distance is used in the processes in steps S20–S22 is that, once the data for the longer distance indicates that the designating device 4 has been inserted into (has touched) the coordinate inputting/detecting plane of the coordinate inputting/detecting area 3, the data for a shorter distance necessarily indicates that the designating device 4 has been inserted into (has touched) the coordinate inputting/detecting plane of the coordinate inputting/detecting area 3.

After the positional information of the designating device 4 is obtained based upon the data from the optical units 5 at both sides (refer to the above equations (2) and (3)) in step S23, in the following step S24, the coordinates of the designating device 4 in the coordinate inputting/detecting area 3 are obtained by the following equations (4) and (5) for obtaining the two dimensional coordinates (x, y) of the point P designated by the designating device 4 (step S24):

$$X = w \cdot \tan \theta nR / (\tan \theta nL + \tan \theta nR) \quad (4)$$

$$Y = w \cdot \tan \theta nL \cdot \tan \theta nR / (\tan \theta nL + \tan \theta nR) \quad (5).$$

Thus, the function of a recognition device for obtaining the coordinates of the designating device 4 in the coordinate inputting/detecting area 3 is performed.

Thereafter, in step S25, a determination is made as to whether or not a plurality of points have been designated by the designating device 4, and if a plurality of points have been designated (YES in step S25), the information about such setting of a plurality of points is sent to a PC (in step S26), and the operation then returns to step S2. If it is determined that a plurality of points have not been designated in step S25 (NO in step S25), the data of the coordinates which has been obtained is sent to the PC (in step S27), and the operation then returns to step S2. The PC performs a predetermined process according to the received coordinates data. For example, when the coordinate inputting/detecting area 3 is a display, drawing according to the coordinates data is performed in the display.

In the above embodiment, a coordinate inputting/detecting apparatus using a returning light interrupting system has been demonstrated as an example. However, the present invention can be applied to optical coordinate inputting/detecting apparatuses in general in which the front surface of a touch panel forms a coordinate inputting/detecting area. For example, the present invention can be applied to a coordinate inputting/detecting apparatus using an LED array system, a coordinate inputting/detecting apparatus using a camera imaging system, a coordinate inputting/detecting apparatus using a rotation scanning system and a pen having a reflective plate, and so forth.

FIG. 8 illustrates an example of a coordinate inputting/detecting apparatus 51 using an LED array system, which is described, for example, in Japanese Patent Laid-open publication No. 5-173699.

The coordinate inputting/detecting apparatus 51 includes, as illustrated in FIG. 8, an Xm number of light emitting devices 52, for example light emitting diodes (LEDs), which are arranged in a horizontal direction, an Xm number of light receiving devices 53, for example photo transistors, which are arranged so as to face the LEDs 52, respectively, a Yn number of LEDs 54 which are arranged in a vertical direction, and a Yn number of photo transistors 55 which are arranged so as to face the LEDs 54, respectively, such that a coordinate inputting/detecting area 57 is formed as an internal space of a coordinate inputting/detecting member 56 formed in a rectangular shaped frame.

If a designating device having the light interrupting property, for example, a finger 58, is inserted into the coordinate inputting/detecting area 57 so as to touch a surface of the coordinate inputting/detecting area 57, a light path between the light emitting device 52 and the light receiving device 53 passing through the position where the finger 58 is located is interrupted by the finger 58, and thereby each receiving light quantity of the photo transistors 53 and 55, which are located in the interrupted light path, decreases. Therefore, by averaging the positions of the photo transistors 53 and 55, the two dimensional coordinates 59 of a portion in the coordinate inputting/detecting area 57 touched by the finger 58 are obtained.

Figure 9:
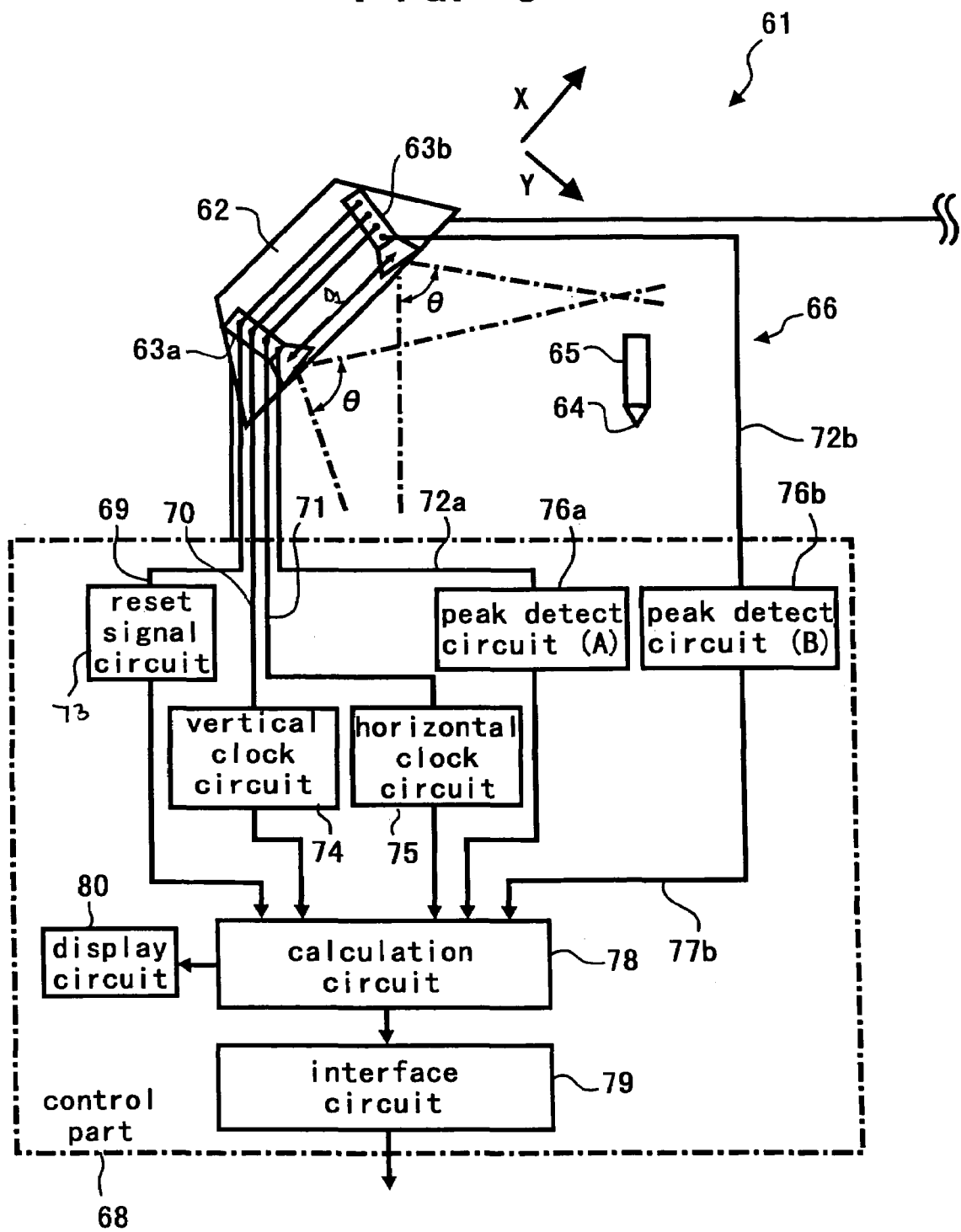
FIG. 9 is a block diagram illustrating a construction of a coordinate inputting/detecting apparatus using a camera imaging system.

FIG. 9 is a block diagram of a coordinate inputting/detecting apparatus 61 using a camera imaging system. Reference numeral 62 denotes an infrared rays position detecting part, and reference numerals 63a and 63b respectively denote infrared rays CCD cameras as optical units serving as image inputting devices, which are arranged in a horizontal direction so as to be spaced from each other a distance D, in the infrared rays position detecting part 62. Reference numeral 64 denotes an infrared rays LED, and reference numeral 65 denotes a coordinate inputting unit serving as a designating device. The coordinate inputting unit 65 is formed in a pen-like shape and has the infrared rays LED 64 at a tip end thereof so as to irradiate infrared rays from the infrared rays LED 64 upward. Thus, an imaging range of the infrared rays position detecting part 62 is set as a two dimensional coordinate inputting/detecting area 66 and is formed in a plane by a coordinate inputting/detecting member (not shown).

Reference numeral 68 denotes a control part, reference numeral 69 denotes a reset signal, which is generated at the control part 68 and is input to the infrared rays CCD cameras 63a, 63b of the infrared rays position detecting part 62, reference numeral 70 denotes a vertical clock signal for scanning in a vertical direction, which is generated at the control part 68 and which is input to the infrared rays CCD cameras 63a, 63b, and numeral 71 denotes a horizontal clock signal for scanning in a horizontal direction, which is generated at the control part 68 and which is input to the infrared rays CCD cameras 63a, 63b. The infrared rays cameras 63a, 63b start scanning in an X-Y direction in response to inputting of the reset signal 69, the vertical clock signal 70 and the horizontal clock signal 71.

Reference numerals 72a, 72b respectively denote image signals, which are output from the infrared rays CCD cameras 63a, 63b. Reference numeral 73 denotes a reset circuit to generate the reset signal 69, reference numeral 74 denotes a vertical clock circuit to generate the vertical clock signal 70, and reference numeral 75 denotes a horizontal clock circuit to generate the horizontal clock signal 71. Reference numerals 76a, 76b denote peak detect circuits (A), (B) which respectively detect the peaks of waves based upon the image signals 72a, 72b and generate peak signals in correspondence to a cycle of the horizontal clock signal 71. Reference numerals 77a, 77b respectively denote peak detect signals output from the peak detect circuits 74a, 74b.

Reference numeral 78 denotes a calculation circuit to calculate the coordinates of a position. Reference numeral 79 denotes an interface circuit that transfers the coordinates calculated by the calculation circuit 78 to a computer (not shown). Reference numeral 80 denotes a display circuit to display the position according to the coordinates calculated by the calculation circuit 78 in a display apparatus used with the coordinate inputting/detecting apparatus 61. Further, an audio circuit that generates, for example, an alerting sound when the coordinate inputting part 65 is positioned at a position outside the imaging range (the coordinate inputting/detecting area 66) of the infrared rays position detect part 62, may be arranged, so that the operability is enhanced. Furthermore, a lens magnification adjusting circuit or a focal length adjusting circuit may be provided at each of the infrared rays CCD cameras 63a, 63b, so that the inputting resolution and the detect range can be set according to the size of an original, the required precision level of inputting, or the space allowed for operating the apparatus 61. Thereby, the operability of the apparatus 61 can be further enhanced.

In the above coordinate inputting/detecting apparatus 61, the control part 68 is separated from the infrared rays position detect part 62, however, by making each of the above-described circuits small, and the control part 68 and the infrared rays detect part 62 may be integrated.

Figure 10:
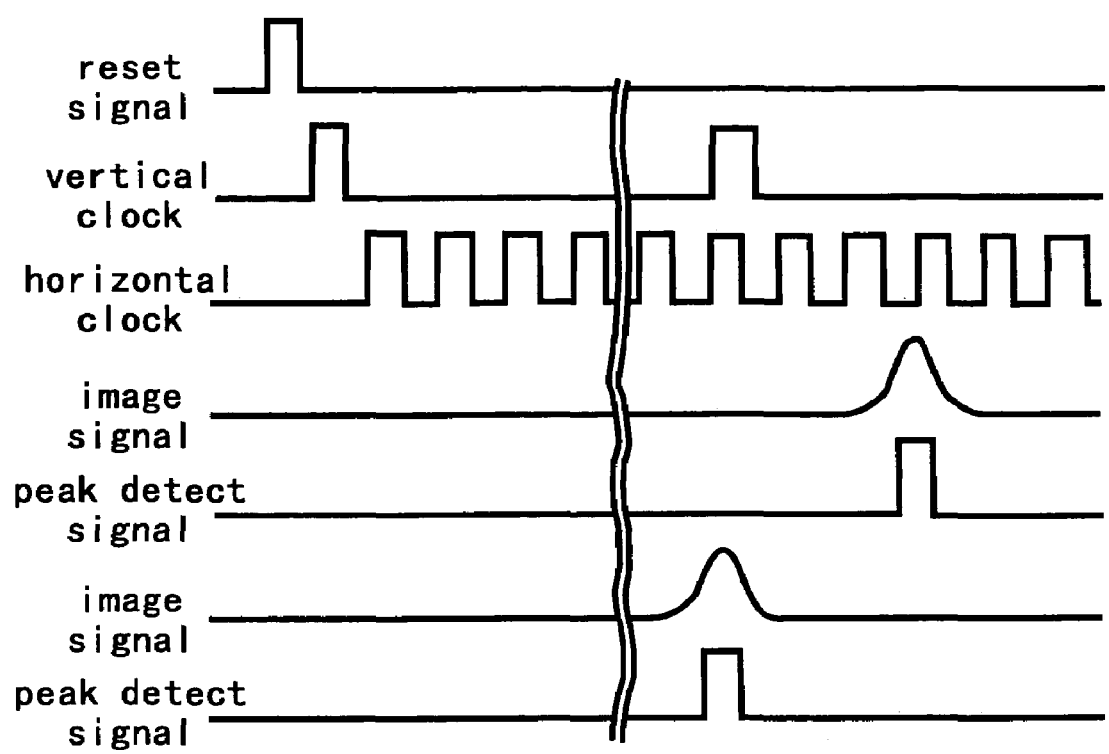
FIG. 10 is a timing chart illustrating signal wave forms of the coordinate inputting/detecting apparatus using a camera imaging system.

Now, an operation of the coordinate inputting/detecting apparatus 61 as described above is described referring to FIG. 10, which is a timing chart illustrating signal wave forms of the coordinate inputting/detecting apparatus 61.

First, the reset signal 69, the vertical clock signal 70, and the horizontal clock signal 71 are simultaneously input to the infrared rays CCD cameras 63a, 63b, and thereby the infrared rays position detect part 62 inputs the image signals 72a, 72b from the infrared rays CCD cameras 63a, 63b into the control part 68.

If the infrared rays CCD cameras 63a, 63b photograph the pen-like shaped coordinate inputting part 65 at a normal exposure, the whole part of the pen-like shaped coordinate inputting part 65 is imaged. However, if the infrared rays CCD cameras 63a, 63b photograph the pen-like shaped coordinate inputting part 65 at an underexposure, only a light emitting part of the infrared rays LED 64 is imaged, and the other parts of the coordinate inputting part 65 are not imaged and are black.

Accordingly, strong peaks appear in the image signals 72a, 72b of the infrared rays CCD cameras 63a, 63b at the positions corresponding to the position of the infrared rays LED 64, respectively. The strong peaks are respectively detected by the peak detect circuits 76a, 76b and resulting peak detect signals 77a, 77b are output to the calculating circuit 78. At the calculating circuit 78, according to a conversion table (not shown) stored in advance in a ROM (not shown) of the control part 68, the angles of the position of the infrared rays LED 64, corresponding to which the peaks have appeared in the image signals 72a, 72b of the infrared rays CCD cameras 63a, 63b, relative to respective origin points of the infrared rays CCD cameras 63a, 63b, can be determined. Therefore, based upon the above angle information of the infrared rays LED 64 relative to the origin points of the infrared rays CCD cameras 63a, 63b and a distance L between the two infrared rays CCD cameras 63a, 63b, the two dimensional coordinates position of the coordinate inputting part 65 can be calculated. The data of the two dimensional coordinates thus obtained is then output, for example, to the computer via the interface circuit 79, so that the position according to the calculated coordinates is displayed in the display apparatus.

Figure 11A:
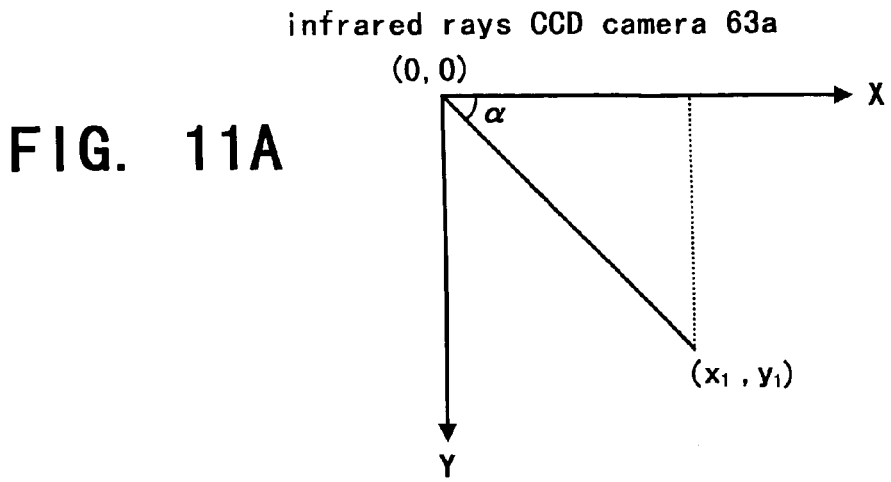
FIGS. 11A–11C are diagrams for explaining a method of calculating the two dimensional coordinates of a position in the coordinate inputting/detecting apparatus.
Figure 11B:
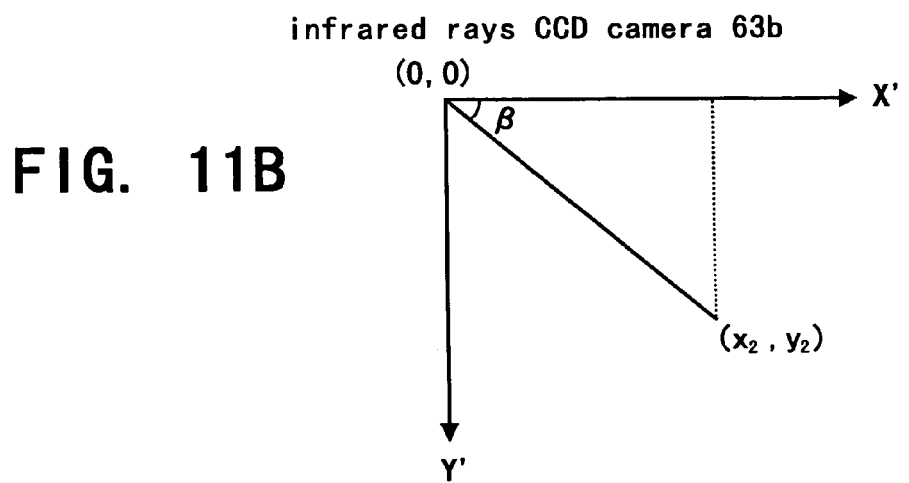
Figure 11C:
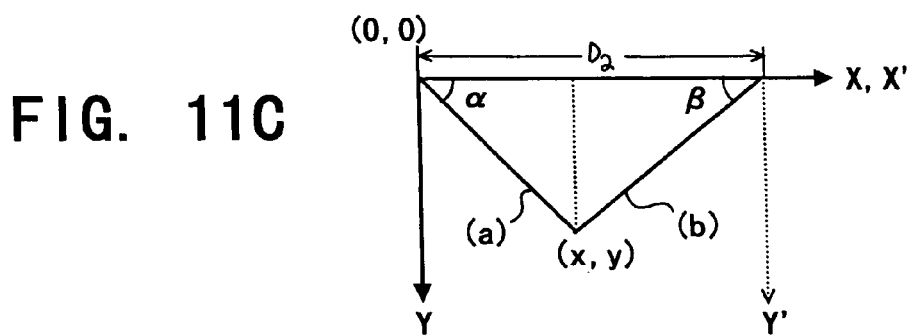

Next, a method of calculating two dimensional coordinates in the above coordinate inputting/detecting apparatus 61 is described with reference to FIGS. 11A–11C. The peak detect signals 77a, 77b indicating the position of the coordinate inputting part 65 having the infrared rays LED 64 are respectively obtained from the image signals 72a, 72b of the two infrared rays CCD cameras 63a, 63b, and based upon the position of the vertical clock signal 70 from the reset signal 69 and the position of the horizontal clock signal 71, respective two dimensional coordinates (x1, y1) and (x2, y2) of the coordinate inputting part 65 with respect to the infrared rays CCD cameras 63a and 63b are obtained.

The origin points of the coordinate axes are appropriately determined for the infrared rays CCD cameras 63a, 63b, respectively. For example, in this embodiment, the origin points are set at the lower left corners of the photographing areas of the infrared rays CCD cameras 63a, 63b, respectively. Accordingly, angles α, β of the infrared rays LED 64 relative to the origin points at the infrared rays CCD cameras 63a, 63b are obtained by the following formulas (6):

$$\alpha = \tan^{-1}(y1/x1)$$

$$\beta = \tan^{-1}(y2/x2) \qquad (6).$$

From these formulas, the angles α, β of the infrared rays LED 64 relative to the infrared rays CCD cameras 63a, 63b are obtained. Here, when the position of one of the infrared rays CCD cameras 63a, 63b is set to be the origin point and a distance between the two infrared rays CCD cameras 63a, 63b is represented by $D_2$, as illustrated in FIG. 11(c), straight lines (a) and (b) are expressed by the following formulas (7):

$$(a) y = (\tan \alpha) \cdot x$$

$$(b) y = \{\tan(\pi - \beta) \cdot (x - D_2)\} \qquad (7).$$

The coordinates of the coordinate inputting part 65 are obtained by solving the above simultaneous equations of first degree. For increasing the operating speed of the calculating circuit 78, a conversion table for obtaining the coordinates based upon the angles α, β can be provided, and thereby the coordinates can be immediately obtained and smooth inputting of figures and characters is realized.

Thus, in the coordinate inputting/detecting apparatus 61 using a camera imaging system including an image inputting device such as an electronic camera, the two dimensional coordinates of an inputting figure can be precisely detected without a need of placing a touch panel, for example, on an operating table, and using a space over the operating table. Therefore, the operating table can be used in a more effective manner. Further, even when the original is a bundled one, an operation of designating and inputting a position of the figure can be performed on the bundled original placed on the operating table. Furthermore, when the original includes a figure, for example, the photographing range can be variably set and the resolution can be also set according to the size of the original by the function of the lens magnification adjusting circuit, and thereby the operability and the easiness of use are enhanced.

Figure 12:
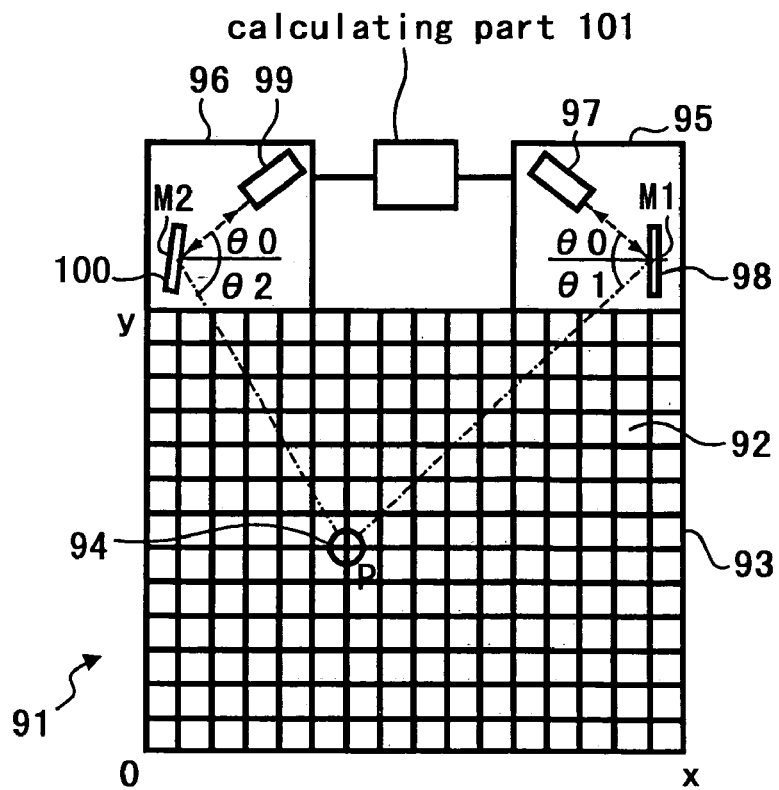
FIG. 12 illustrates a coordinate inputting/detecting apparatus using a rotation scanning system including a pen having a reflective plate.

FIG. 12 illustrates a coordinate inputting/detecting apparatus 91 using a rotation scanning system including a pen having a reflective plate. As illustrated in FIG. 12, the coordinate inputting/detecting apparatus 91 includes a flat member 93 that defines a two dimensional coordinate inputting/detecting area 92. A cursor 94 functioning as a designating device is movably arranged on the coordinate inputting/detecting area 92. The cursor 94 has a function to reflect a scanning light, which is parallel to a surface of the coordinate inputting/detecting area 92, so as to be returned to an emerged point. By adjusting a center point P of the cursor 94 to a position desired to be input, the two dimensional coordinates of the position are designated.

A pair of optical units 95, 96 are arranged above the coordinate inputting/detecting area 92 so as to be spaced from each other. A fixed light source 97 as a light emitting device including, for example, a laser emitting diode, is accommodated within the optical unit 95 at the right side. Further, a reflective mirror 98 that rotates at a constant speed around a predetermined rotation axis is arranged so as to sequentially reflect the light fluxes emitted by the light source 97 so that a first rotating scanning light flux is generated over the surface of the coordinate inputting/detecting area 92. Also, the coordinate inputting/detecting apparatus 91 includes a light receiving element (not shown) for receiving a returning light reflected by the cursor 94. By being configured as described above, the optical unit 95 measures a declination angle $\theta_1$ of a returning light.

The optical unit 96 at the left side has a similar configuration as the optical unit 95, and the light fluxes emitted by a fixed light source 99 are sequentially reflected by a reflective mirror 100 rotating around a rotation axis M2, so that a second scanning light flux crossing the first scanning light flux is generated. Similarly, the optical unit 96 measures a declination angle $\theta_2$ of a returning light reflected by the cursor 94.

A calculating part 101 including a computer is connected to the pair of optical units 95, 96, and the two dimensional coordinates (x, y) of the inputting point P are calculated using predetermined two dimensional coordinates calculation formulas (8), described below, based upon the measured values of a pair of the declination angles $\theta_1$, $\theta_2$. Here, "w" represents a distance between the rotational centers of the rotation axes M1 and M2.

$$X = w \cdot \tan \theta_1 / (\tan \theta_2 + \tan \theta_1)$$

$$Y = w \cdot \tan \theta_2 \cdot \tan \theta_1 / (\tan \theta_2 + \tan \theta_1) \quad (8).$$

Figure 13:
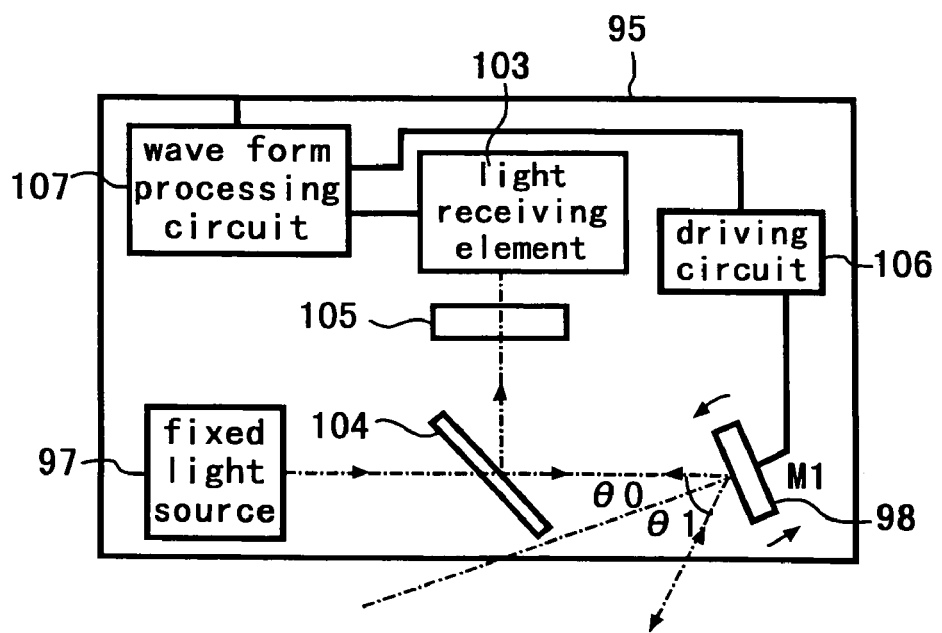
FIG. 13 illustrates a configuration of an optical unit used in the coordinate inputting/detecting apparatus.

FIG. 13 illustrates a configuration of the optical unit 95 at the right side. The optical unit 96 at the left side has a similar configuration. The optical unit 95 includes the fixed light source 97, the reflective mirror 98 that rotates at a constant equiangular speed around the rotation axis M1, and a light receiving element 103 for receiving a returning light reflected by the cursor 94 and for generating a light detection signal. A light flux emitted by the fixed light source 97 passes through a half-mirror 104 and moves toward a vicinity of the rotation axis M1 of the reflective mirror 98. The light flux is scanned at a constant equiangular speed, and when passing a central axis of the cursor 94, the light flux is reflected so as to return to the reflective mirror 98. The light flux is reflected by the reflective mirror 98 again, and after passing through a filter 105 via reflecting off the half-mirror 104, the light flux is received by the light receiving element 103 including, for example, a photodiode. The light receiving element 103 outputs a light detection signal in synchronism with a light receiving timing.

The reflective mirror 98 is rotated at a constant equiangular velocity by a driving circuit 106. The driving circuit 106 outputs a timing pulse for each rotation cycle of the reflective mirror 98. The timing pulse output by the driving circuit 106 and the light detection signal, e.g. a pulse, output by the light receiving element 103 are input into a wave form processing circuit 107, and, after having been processed by the wave form processing circuit 107, are output from an output terminal of the wave form processing circuit 107. An output signal from the wave form processing circuit 107 is output on the basis of the timing pulse and while being adjusted to a time interval between the times when light detection pulses are generated. Therefore, because the reflective mirror 98 rotates at a constant equiangular velocity, the output signal indicates an angle $\theta_0 + \theta_1$ including a declination angle of a returning light flux.

Figure 14:
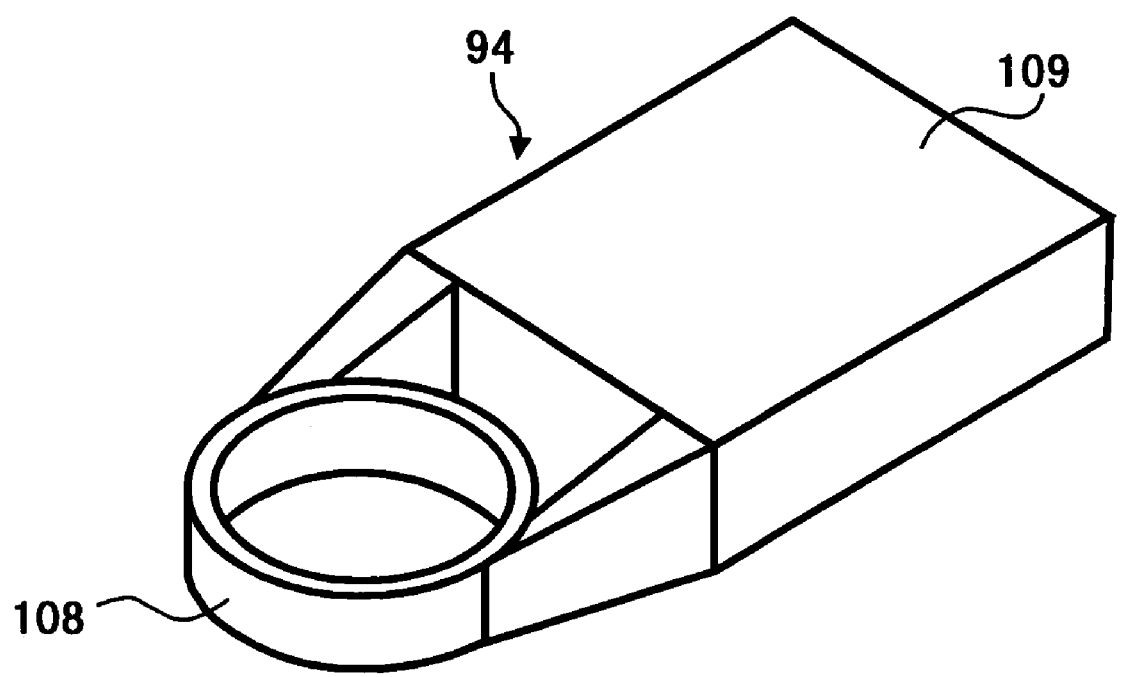
FIG. 14 is a perspective view illustrating an example of a cursor for inputting a coordinate used in the coordinate inputting/detecting apparatus.

FIG. 14 is a perspective view illustrating an example of the cursor 94 for inputting coordinates. The cursor 94 includes a light reflective member 108 having a central axis and formed in a cylinder shape, and a support member 109. An aiming member (not shown) having a hair-cross mark, whose crossing point coincides with the axis of the cylinder shaped light reflective member 108, is attached to the inside of the light reflective member 108. If the cursor 94 is placed while a bottom surface of the support member 109 is in contact with a given surface of the coordinate inputting/detecting surface 92, the central axis of the cylinder shaped light reflective member 108 is vertically placed relative to a coordinate inputting plane (the coordinate inputting/detecting surface 92). In this state, a point, which is desired to be input, is designated while holding the support member 109 and using the aiming member. Because a scanning light flux, that is in parallel to a coordinate plane and that moves toward the central axis of the reflective member 108, is incident on a reflective surface of the reflective member 108 in a vertical direction relative to the reflective surface of the reflective member 108, the scanning light is reflected so as to return in a reverse direction through a same light path, through which the scanning light moves to be incident on the reflective surface of the reflective member 108, and thereby a returning light returns toward the fixed light source 97. The cursor 94 may be used for any coordinate plane as long as the coordinate plane is within a range that the scanning light flux reaches.

Figure 15:
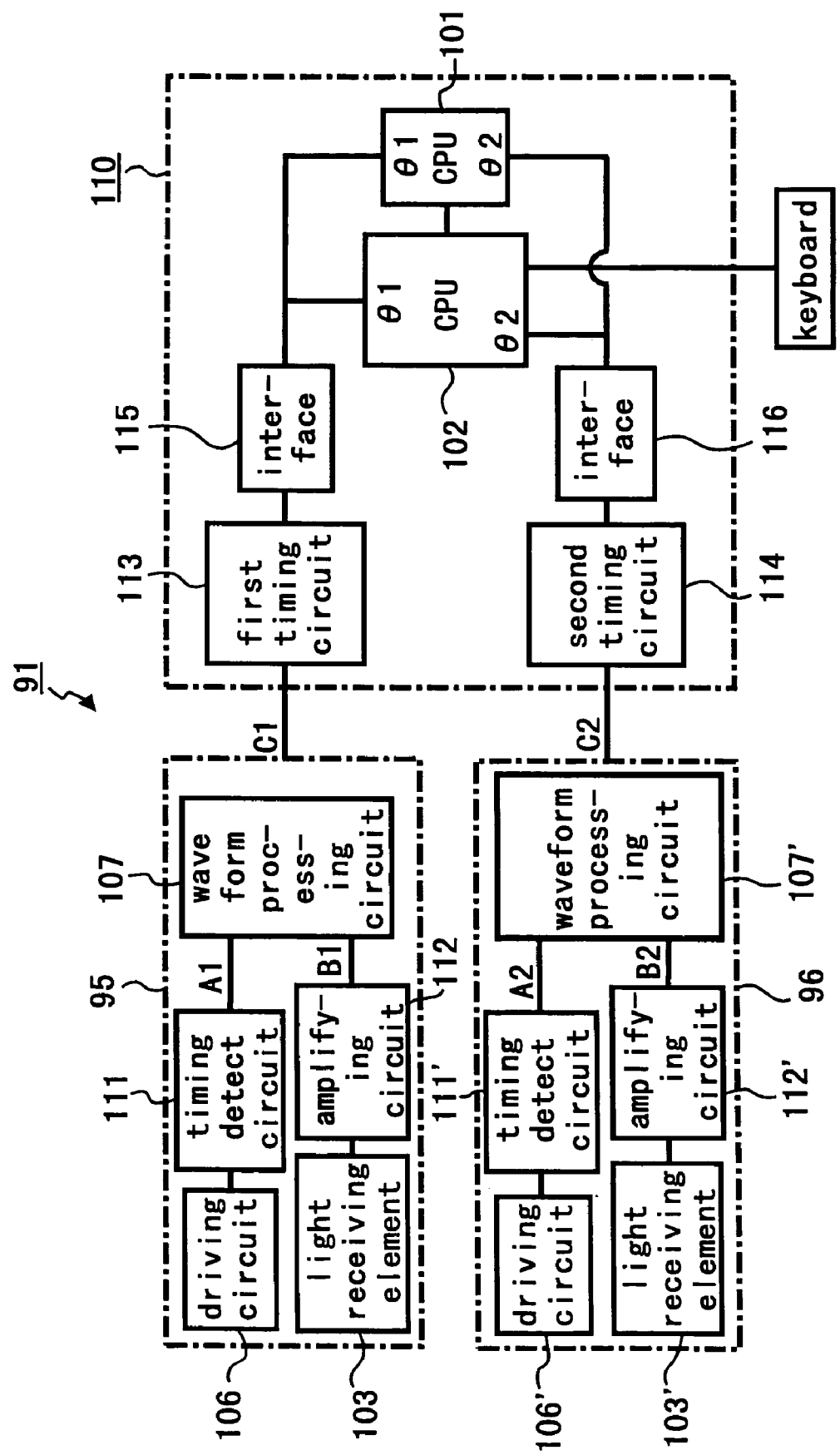
FIG. 15 is a block diagram illustrating an example of a construction of electrical circuits of the coordinate inputting/detecting apparatus.

FIG. 15 is a block diagram illustrating an example of a construction of the electrical circuits of the coordinate inputting/detecting apparatus 91. The coordinate inputting/detecting apparatus 91 includes the pair of the optical units 95, 96, as described above, and a computer 110 including the calculating part 101. The optical units 95, 96 and the computer 110 are electrically connected with each other by cables. The optical unit 95 includes a driving circuit 106 for rotating the reflective mirror 98 at a constant equiangular velocity and a timing detect circuit 111 connected with the driving circuit 106. The timing detect circuit 111 outputs a timing pulse A1 each time the reflective mirror 98 rotates in a predetermined cycle T at a predetermined timing, for example, at a timing that a normal line for the reflective mirror 98 is in parallel to a light flux from the light source 97 (see FIG. 16). The light receiving element 103 is connected with an amplifying circuit 112, and a detection signal is output, after having been amplified, as a detection pulse B 1. The wave form processing circuit 107 is connected with the timing detect circuit 111 and the amplifying circuit 112, so as to process the wave forms of the received timing pulse A1 and detect pulse B1 and outputs an output pulse C1. The output pulse C1 is generated in synchronism with receiving of a returning light reflected by the cursor 94, and therefore relates to a combined angle of a declination angle of the returning light and an attachment angle of the optical unit 95, i.e., $\theta_0+\theta_1$. The optical unit 96 has a similar electrical configuration as the optical unit 95, and therefore the description thereof is omitted.

The computer 110 has a first timing circuit 113 which times a pulse interval of the output pulse C1 from the right side optical unit 95 so as to obtain angle data $\theta_1$. The computer 110 also has a second timing circuit 114 which times a pulse interval of the output pulse C2 from the left side optical unit 96 so as to obtain angle data $\theta_2$. The calculating part 101 is connected with the first and second timing circuits 113 and 114 via interfaces 115 and 116. The calculating part 101 calculates the two dimensional coordinates of a position desired to be input based upon a pair of angle data $\theta_1$ and $\theta_2$, which has been actually measured, using the predetermined coordinates calculation formula (8) described above.

Figure 16:
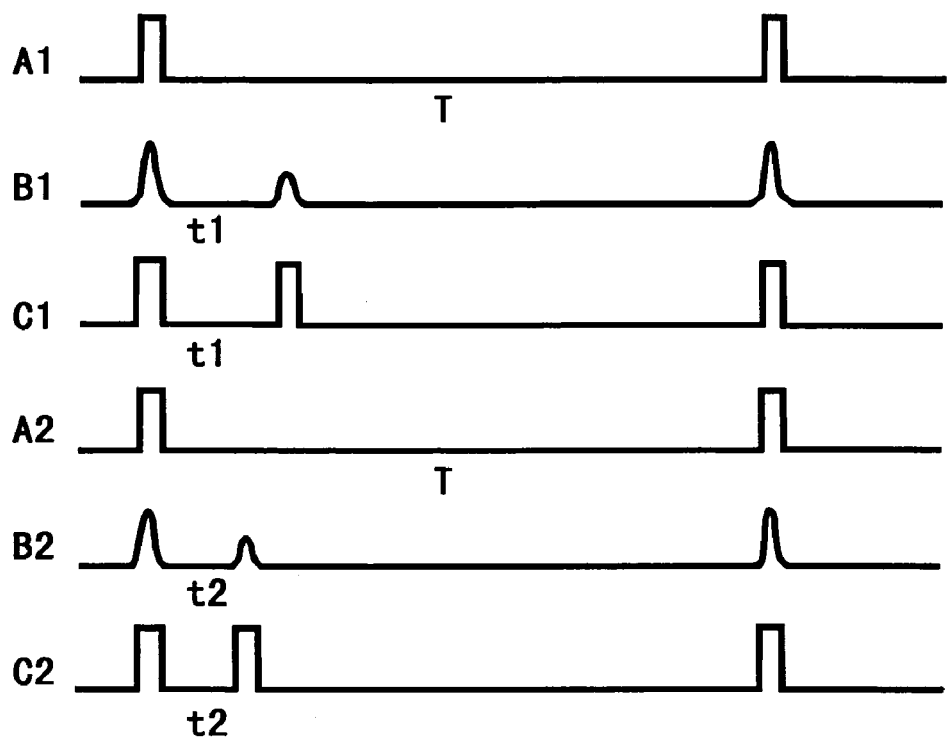
FIG. 16 is a timing chart illustrating wave forms of the electrical circuit of the coordinate inputting/detecting apparatus.

A method of measuring a declination angle is briefly described referring to a timing chart illustrated in FIG. 16. First, when the reflective mirror 98 is rotated at a cycle T at the right side optical unit 95, the timing detect circuit 111 outputs the timing pulse A1 at the cycle T. At this time, the amplifying circuit 112 outputs the detection pulse B 1 in synchronism with a light receiving timing of the light receiving element 103. The detection pulse B 1 has a large peak and a small peak following the large peak. The large peak is generated when the reflective mirror 98 is perpendicular to a light flux from the light source 97. The large peak of the detection pulse B1 is in synchronism with the timing pulse A1, and is not related to a returning light from the cursor 94. The small peak following the large peak is in synchronism with a timing that a returning light from the cursor 94 is received by the light receiving element 103, and if the small peak is assumed to have been generated a time t1 after the large peak, the time t1 is proportionally related to the angle data $\theta_0+\theta_1$, which is desired to be obtained. The wave form processing circuit 107 processes the wave forms of the timing pulse A1 and the detection pulse B1 and outputs the output pulse C1.

A similar operation is performed at the left side optical unit 96. A rotation cycle and phase of the reflective mirror 100 coincides with that of the right side optical unit 95, and therefore a same timing pulse A2 as the timing pulse A1 is obtained. A detection pulse B2 has a large peak, which is followed by a small peak a time t2 thereafter. A returning light from the cursor 94 is received at the timing of the small peak. An output pulse C2 is obtained based upon the timing pulse A2 and the detection pulse B2, and the time t2 between the large and small peaks is proportionally related to the angle data $\theta_0+\theta_2$, which is desired to be obtained.

Then, the first timing circuit 113 times the pulse time interval t1 of the output pulse C1 and obtains the angle data $\theta_1$ by subtracting a known attaching angle $\theta_0$. Also, the second timing circuit 114 times the pulse time interval t2 of the output pulse C2, and obtains the angle data $\theta_2$ by subtracting a known attaching angle $\theta_0$.

Figure 17:
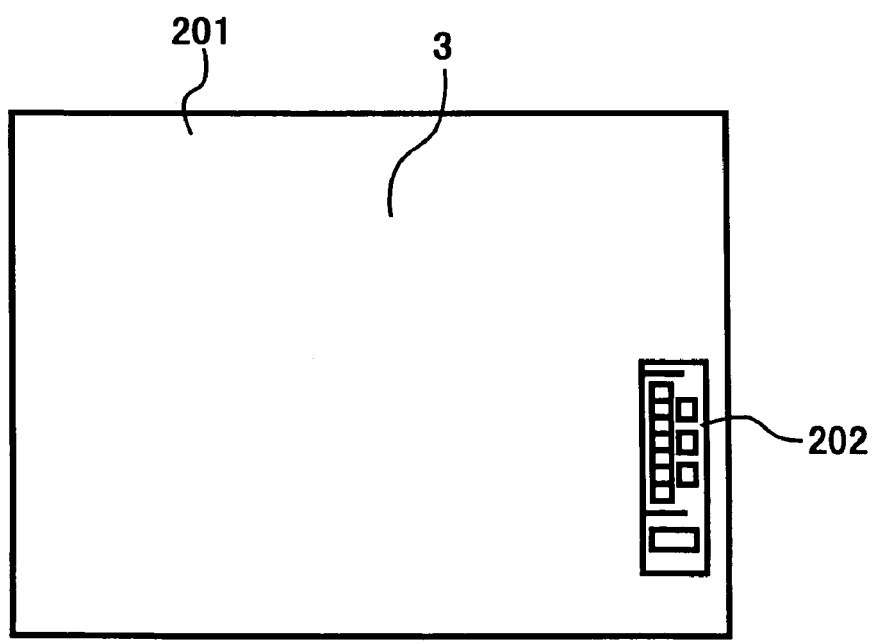
FIG. 17 is a front view illustrating a display device for inputting a threshold value according to another embodiment of the present invention.
Figure 18:
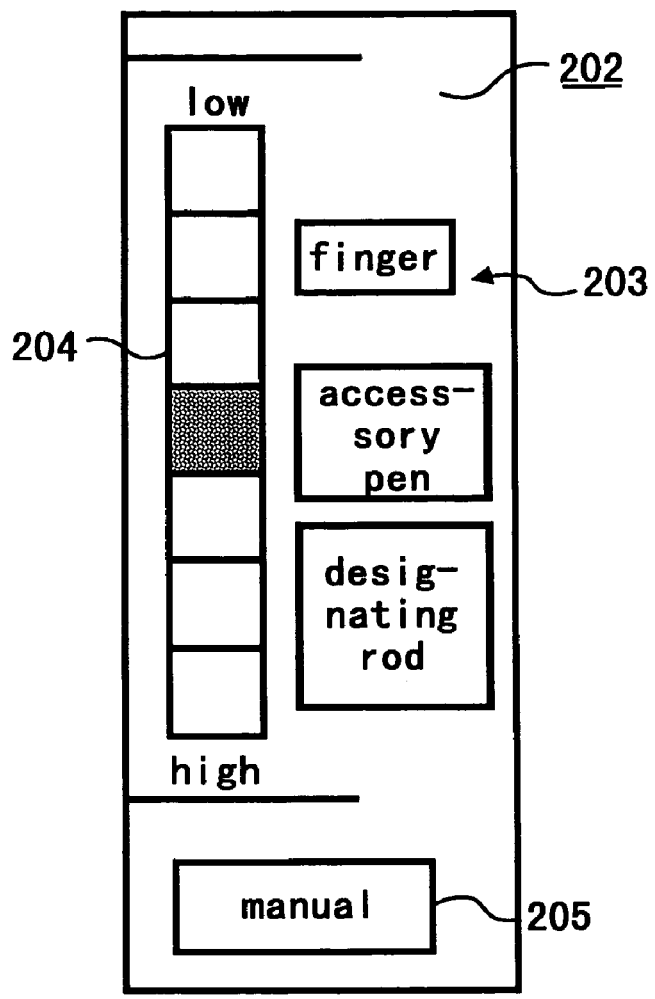
FIG. 18 is a schematic drawing illustrating a dialogue box displayed by the display device.
Figure 19:
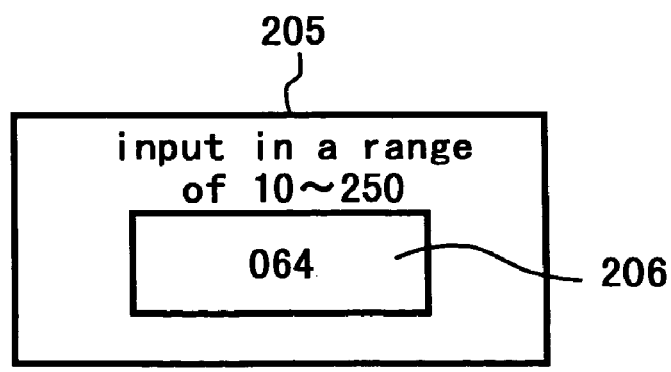
FIG. 19 is a schematic drawing illustrating an example of a display to which a display of a part indicated as a manual operation is switched when the part is touched.
Figure 20:
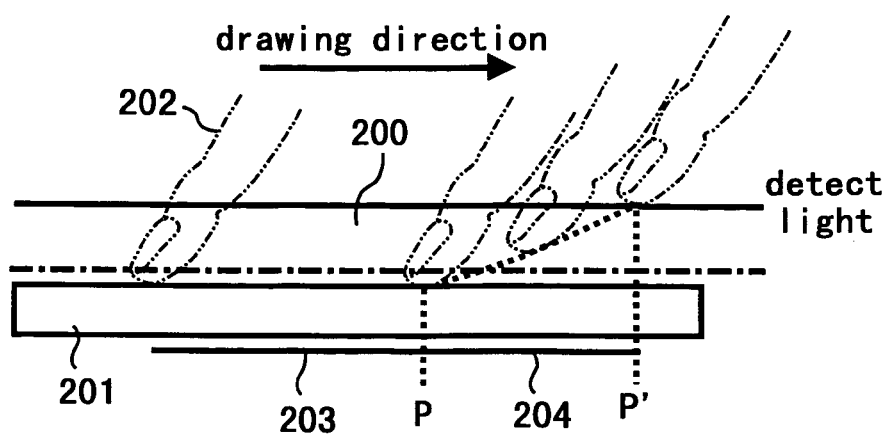
FIG. 20 is an explanatory drawing for explaining an operation of drawing with a finger.
Figure 21A:
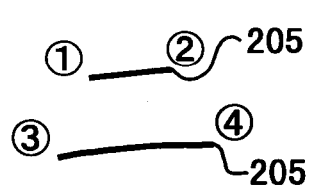
FIGS. 21A–21F are exaggerated drawings for explaining examples of structure of representative Japanese characters and examples of drawing such characters.
Figure 21B:
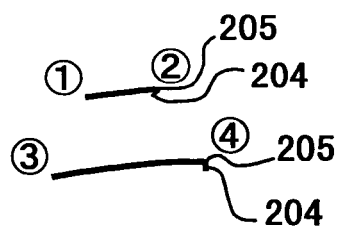
Figure 21C:
Figure 21D:
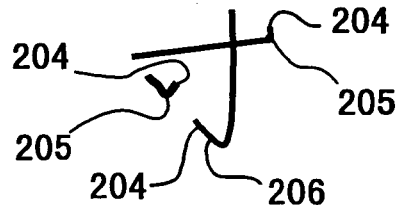
Figure 21E:
Figure 21F:

Now, another embodiment with respect to setting of a threshold value is described referring to FIGS. 17 through 19. The same parts as those of the previous embodiments are denoted by like references and the description thereof is omitted.

In the coordinate inputting/detecting apparatus 1 according to the previous embodiments, the reliability of a determination as to whether the designating device 4 has been inserted into the coordinate inputting/detecting area 3 is enhanced by using a relatively low threshold value in the determination, and the trailing phenomenon is effectively avoided by using a relatively high threshold value in determining the coordinates of the designating device 4 in the coordinate inputting/detecting area 3. Further, the coordinate inputting/detecting apparatus 1 changes the threshold values according to a distance from the optical unit 5 to the designating device 4 so as to be adjusted to the attenuation of an output signal of the optical unit 5 according to the distance from the optical unit 5 to the designating device 4.

In another embodiment described hereinbelow, with respect to setting of the threshold values, a process which is substantially the same as that of the previous embodiments is applied. However, another embodiment demonstrates an example in which the threshold value, which is used in determining if the designating device is inserted into the coordinate inputting/detecting area 3, is more finely set according to the kind of the designating device 4 and the habit or liking of the user.

In this embodiment, as illustrated in FIG. 17, for the coordinate inputting/detecting area 3, a display apparatus 201, for example a plasma display or other similar display device, which can display information according to image data, is used. The display apparatus 201 displays a dialog box 202 for setting a threshold value, for example, at a right lower corner of the display apparatus 201, as illustrated in FIG. 17. The display content of the dialog box 202 includes, as illustrated in FIG. 18, a part 203 including a finger part having an indication of "finger", an accessory part having an indication of "accessory pen", and a designating rod part having an indication of "designating rod", respectively, a part 204 including seven parts indicating ranges for the threshold value, respectively, and a part 205 having an indication of "manual", which is used when manually setting the threshold value.

The part 203 is used for setting the threshold value, which is used in determining if the designating device 4 has been inserted into the coordinate inputting/detecting area 3, to a specific value corresponding to the kind of the designating device 4 used for designating a point in the coordinate inputting/detecting area 3. Specifically, upon touching each part of the "finger" part, the "accessory pen" part, and the "designating rod" part, a corresponding threshold value is set. In this embodiment, a lowest threshold value is set when the "finger" part is touched, and higher threshold values are set in order of the "accessory pen" part and the "designating rod" part when these parts are touched, respectively. This is because that the area in the coordinate inputting/detecting area 3 designated by the designating device 4 is smaller in the order of the cases where a finger, an accessory pen and a designating rod are used for the designating device 4, respectively, and the peak level of an output signal from the optical unit 5 correspondingly decreases. For example, if a same threshold value is used for each of the cases where a finger having a relatively large designating area and a designating rod having a relatively small designating area are used, and if the used threshold value is the one adjusted to the case in which a finger is used, when a designating rod is used for the designating device 4, a trailing phenomenon tends to easily occur. On the other hand, if the used threshold value is the one adjusted to the case in which a designating rod is used, when a finger is used for the designating device 4, an insertion of the designating device 4 (finger), which should be detected, may not be detected. This problem is avoided by providing a facility for enabling the user to specify the kind of the designating device 4, i.e., the part 203, and by allowing the threshold value for determining if the designating device 4 has been inserted into the coordinate inputting/detecting area 3 to be set to the one corresponding to the kind of the designating device 4 designated by the part 203.

The part 204 is used for setting a threshold value for determining if the designating device 4 has been inserted into the coordinate inputting/detecting area 3 for each of the cases where a finger, an accessory pen, and a designating rod are used. In this embodiment, the part 204 has seven parts indicating seven steps for the threshold value, so that, by touching respective parts of the part 204, the threshold value can be variably set in the range of seven steps for each of the cases in which a finger, an accessory pen, and a designating rod are used, respectively.

The part 205 displays a word indicating a manual operation and enables manual inputting of a concrete threshold value. By touching the part 205, a dialog message is displayed, for example as illustrated in FIG. 19, and inputting a concrete threshold value is enabled, for example, in a range of 10–250. Inputting is performed by touching an inputting area 206.

Inputting in the part 203, the part 204, and the part 205 of the dialog box 202 is recognized, when the detecting device 4, such as a finger, an accessory pen, or a designating rod, is inserted in a predetermined area within the dialog box 202, by detecting the designating device 4 with the coordinate inputting/detecting apparatus 1. That is, the CPU 31 in FIG. 6 obtains the information of a display position of the dialog box 202 from a PC having the function to control driving of the display apparatus 201. Accordingly, the CPU 31, that recognizes the coordinates of a touched position of the display apparatus 201 according to an output signal from the optical unit 5, can recognize, by obtaining the coordinates data of the designating device 4, which area of the dialog box 202 has been touched. Thus, when the designating device 4 is inserted into the coordinate inputting/detecting area 3 thereafter, for a threshold value for use in determining if the designating device 4 has been inserted into the coordinate inputting/detecting area 3, the CPU 31 reads out the optimum threshold data from the ROM 32 based upon the recognition of which area of the dialog box 202 has been touched, and uses the same as threshold data.

When the CPU 31 recognizes that the part 205 has been touched by the designating device 4, the CPU 31 sends the recognition data to the PC. Upon receiving the recognition data, the PC switches a display of the dialog box 202 to the one illustrated in FIG. 19 so as to display the inputting area 206. When the operator inputs a desired value (draws a numeral character) in the inputting area 206, the coordinate inputting/detecting apparatus 1 obtains the input coordinates data, and sends the input coordinates data to the PC by a process performed by the CPU 31. The PC, upon receiving the inputted coordinates data, recognizes the input numeral character from the coordinates data. That is, the PC has a character recognition software module and performs a process of recognizing the input character (the input value for a threshold value) based upon the coordinates data. Such a character recognition technology itself is well known and therefore the description thereof is omitted. The PC outputs the recognized input value to the CPU 31 of the coordinate inputting/detecting apparatus 1, and thereby, when the designating device 4 is inserted into the coordinate inputting/detecting area 3 thereafter, the CPU 31 reads out, for the threshold value for determining if the designating device 4 has been inserted in the coordinate inputting/detecting area 3, a corresponding threshold value from the ROM 32 and uses the same threshold value for the threshold data.

Thus, in this embodiment, the user can more finely set the threshold value for determining if the designating device 4 has been inserted into the coordinate inputting/detecting area 3 in accordance with the kind of the designating device 4 and the habit or liking of the user. Thereby, a trailing phenomenon can be further suppressed so that the coordinates of a position can be correctly detected.

The mechanisms and processes set forth in the present description may be implemented using a conventional general purpose microprocessor programmed according to the teachings in the present specification, as will be appreciated to those skilled in the relevant art. Appropriate software coding can be readily prepared by skilled programmers based upon the teachings of the present disclosure, as will also be apparent to those skilled in the art.

The present invention thus also includes a computer program product which may be hosted on a storage medium and include instructions which can be used to program a microprocessor to perform a process in accordance with the present invention. The storage medium can include, but is not limited to, any type of disk including floppy disks, optical disks, CD-ROMs, magneto-optical disks, ROMs, RAMs, EPROMS, EEPROMs, flash memory, magnetic or optical cards, or any type of media suitable for storing electronic instructions.

Numerous additional modifications and variations of the present invention are possible in light of the above teachings. It is therefore to be understood that within the scope of the appended claims, the present invention may be practiced otherwise than as specifically described herein.

The present application claims priority and contains subject matter related to Japanese Patent Applications No. 11-257477 and No. 2000-038328 filed in the Japanese Patent Office on Sep. 10, 1999, and Feb. 16, 2000, respectively, and the entire contents of which are hereby incorporated herein by reference.

What is claimed as new and is desired to be secured by Letter Patent of the United State is:

1. A coordinate input-detecting apparatus including a touch panel to be touched by a pointer, said coordinate input-detecting apparatus comprising:
   a substantially flat two-dimensional coordinate input-detecting area configured to receive insertion of the pointer, said substantially flat two-dimensional coordinate input-detecting area being formed in front of the touch panel and having a prescribed depth;
   an optical unit configured to convert a light intensity distribution signal to digital data; and
   a controller configured to detect the pointer inserted into the coordinate input-detecting area when the digital data detected by the optical unit exceeds a first threshold value;
   wherein said controller calculates a distance between the optical unit and the pointer from the digital data, and sets a second threshold value higher than that of the first threshold in accordance with the distance calculated, and wherein said controller calculates coordinates from the digital data when the digital data exceeds the second threshold value.

2. The coordinate input detecting apparatus of claim 1, wherein the digital data exceeds the second threshold value when the pointer almost contacts the touch panel.

3. The coordinate input detecting apparatus of claim 1, wherein said second threshold unit is determined in accordance with a distance between a point designated by the pointer and the optical unit.

4. The coordinate input detecting apparatus of claim 2, wherein said second threshold unit is determined in accordance with a distance between a point designated by the pointer and the optical unit.

5. The coordinate input detecting apparatus of claim 1, wherein the optical unit includes at least first and second optical devices each having a light source and a light acceptance unit, wherein said second threshold value is set and used in comparing with detection signals generated by the first and second optical units.

6. The coordinate input detecting apparatus of claim 2, wherein the optical unit includes at least first and second optical devices each having a light source and a light acceptance unit, wherein said second threshold value is set and used in comparing with detection signals generated by the first and second optical units.

7. The coordinate input detecting apparatus of claim 3, wherein the optical unit includes at least first and second optical devices each having a light source and a light acceptance unit, wherein said second threshold value is set and used in comparing with detection signals generated by the first and second optical units.

8. The coordinate input detecting apparatus of claim 4, wherein the optical unit includes at least first and second optical devices each having a light source and a light acceptance unit, wherein said second threshold value is set and used in comparing with detection signals generated by the first and second optical units.

9. The coordinate input detecting apparatus of claim 5, wherein said optical units include reflection mirrors each disposed on prescribed sides of the coordinate input-detecting area, said reflection mirrors having surfaces whose every portions return a light beam to the light source, said optical units being disposed at corners on the coordinate input detecting area, respectively.

10. The coordinate input detecting apparatus of claim 6, wherein said optical units include reflection mirrors each disposed on prescribed sides of the coordinate input-detecting area, said reflection mirrors having surfaces whose every portions return a light beam to the light source, said optical units being disposed at corners on the coordinate input detecting area, respectively.

11. The coordinate input detecting apparatus of claim 7, wherein said optical units include reflection mirrors each disposed on prescribed sides of the coordinate input-detecting area, said reflection mirrors having surfaces whose every portions return a light beam to the light source, said optical units being disposed at corners on the coordinate input detecting area, respectively.

12. The coordinate input detecting apparatus of claim 8, wherein said optical units include reflection mirrors each disposed on prescribed sides of the coordinate input-detecting area, said reflection mirrors having surfaces whose every portions return a light beam to the light source, said optical units being disposed at corners on the coordinate input detecting area, respectively.

13. The coordinate input detecting apparatus of claim 9, wherein said optical units further includes a probe light generating device configured to generate and swing and irradiate probe lights toward the reflection mirrors.

14. The coordinate input detecting apparatus of claim 10, wherein said optical units further includes a probe light generating device configured to generate and swing and irradiate probe lights toward the reflection mirrors.

15. The coordinate input detecting apparatus of claim 11, wherein said optical units further includes a probe light generating device configured to generate and swing and irradiate probe lights toward the reflection mirrors.

16. The coordinate input detecting apparatus of claim 12, wherein said optical units further includes a probe light generating device configured to generate and swing and irradiate probe lights toward the reflection mirrors.

17. The coordinate input detecting apparatus of claim 1, wherein said second threshold is decreased as a distance between the pointer and the optical unit is increased.

* * * * *

UNITED STATES PATENT AND TRADEMARK OFFICE
CERTIFICATE OF CORRECTION

PATENT NO.        : 7,113,174 B1                                        Page 1 of 1
APPLICATION NO.   : 09/653336
DATED             : September 26, 2006
INVENTOR(S)       : Takekawa et al.

It is certified that error appears in the above-identified patent and that said Letters Patent is hereby corrected as shown below:

On the title page, the Terminal Discalimer information has been omitted. Item (45) and the Notice information should read as follows:

-- (45)  Date of Patent:    *Sep. 26, 2006

(*)    Notice:  Subject to any disclaimer, the term of this
                  patent is extended or adjusted under 35
                  U.S.C. 154(b) by 107 days.

This Patent is subject to a terminal disclaimer. --

Signed and Sealed this

Twelfth Day of December, 2006

JON W. DUDAS
*Director of the United States Patent and Trademark Office*